United States Patent
Thornton et al.

(10) Patent No.: US 8,019,573 B2
(45) Date of Patent: Sep. 13, 2011

(54) DRAWING CONVERSION ASSIGNMENT AND MANAGEMENT SYSTEM

(75) Inventors: Diane C. Thornton, Charlotte, NC (US); Michael S. Hess, Monroe, NC (US); Rickey Howard Johnson, Charlotte, NC (US)

(73) Assignee: AT&T Intellectual Property I, L.P., Reno, NV (US)

( * ) Notice: Subject to any disclaimer, the term of this patent is extended or adjusted under 35 U.S.C. 154(b) by 2396 days.

(21) Appl. No.: 10/729,259

(22) Filed: Dec. 5, 2003

(65) Prior Publication Data

US 2005/0125304 A1 Jun. 9, 2005

(51) Int. Cl.
*G06F 17/50* (2006.01)
*G06Q 10/00* (2006.01)

(52) U.S. Cl. ......... 703/1; 711/100; 711/133; 705/7.13; 705/7.27; 705/301; 705/305; 705/333; 707/634; 707/661; 707/672; 707/792

(58) Field of Classification Search .............. 705/26, 705/27, 404, 7.13, 7.27, 301, 305, 333; 711/133, 711/100; 703/1; 707/634, 661, 672, 792
See application file for complete search history.

(56) References Cited

U.S. PATENT DOCUMENTS

| | | | | |
|---|---|---|---|---|
| 5,077,685 A * | 12/1991 | Iwashima et al. ............... 703/18 |
| 6,941,514 B2 * | 9/2005 | Bradford ...................... 715/700 |
| 6,954,788 B2 | 10/2005 | Jordan et al. |
| 6,976,192 B1 * | 12/2005 | Eslambolchi et al. .......... 714/45 |
| 6,993,400 B2 * | 1/2006 | Viassolo ........................ 700/99 |
| 7,020,697 B1 * | 3/2006 | Goodman et al. ............ 709/223 |
| 7,467,161 B2 * | 12/2008 | Frisina ................................. 1/1 |
| 7,685,187 B2 * | 3/2010 | Hutchinson et al. .......... 707/674 |
| 7,937,414 B2 * | 5/2011 | Thornton et al. ............. 707/803 |
| 2001/0049751 A1 * | 12/2001 | Nakamura et al. ............. 709/313 |
| 2002/0111842 A1 * | 8/2002 | Miles ................................. 705/8 |
| 2002/0145620 A1 * | 10/2002 | Smith et al. .................... 345/712 |
| 2003/0004988 A1 * | 1/2003 | Hirasawa et al. ............. 707/502 |
| 2003/0007000 A1 * | 1/2003 | Carlson et al. ................ 345/713 |
| 2003/0167199 A1 * | 9/2003 | Thomann et al. ............... 705/10 |
| 2003/0208397 A1 | 11/2003 | VanDusen |
| 2004/0024662 A1 * | 2/2004 | Gray et al. ...................... 705/29 |
| 2004/0054685 A1 * | 3/2004 | Rahn et al. .................... 707/102 |
| 2004/0187113 A1 * | 9/2004 | Viassolo ....................... 718/100 |
| 2004/0205519 A1 * | 10/2004 | Chapel et al. ................. 715/502 |

(Continued)

OTHER PUBLICATIONS

J. Leach and M. K. Miles. "Data Integration, Interoperability, and Conversion Services for US Army Corps of Engineers Automated Document Conversion Strategy Initiative." Created as PDF file on Aug. 4, 2003.*

(Continued)

*Primary Examiner* — Kamini S Shah
*Assistant Examiner* — Kibrom Gebresilassie
(74) *Attorney, Agent, or Firm* — Thomas, Kayden, Horstemeyer & Risley, LLP

(57) ABSTRACT

Drawing conversion assignment and management systems are provided that typically include receiving logic, a database, assignment logic, and completion logic. The receiving logic typically receives notification of completion of a land base drawing file. The database creates a drawing conversion job record associated with the land base drawing file. The assignment logic assigns the drawing conversion job record to a draftsman and instructs the database to record the assignment. The completion logic typically receives a request to close the drawing conversion job record, and instructs the database to mark the drawing conversion job record as closed. Methods and other systems are also provided.

27 Claims, 38 Drawing Sheets

```
WEST FIBER CONVERSION MENU

START PRINTING WIRECENTER
    224 ASSIGN WIRECENTER       222
    226 MARK WIRECENTER COMPLETE
    228 WIRECENTER PRINTING REPORT
    230 VIEW AVAILABLE WIRECENTERS
    232 VIEW YOUR ASSIGNED WIRECENTERS
    234 VIEW ALL ASSIGNED WIRECENTERS
    236 VIEW COMPLETED WIRECENTERS
    238 VIEW ALL ACCEPTED WIRECENTERS
    240 FIBER CONVERSION SUMMARY

RETURN TO MAIN MENU
```

220

U.S. PATENT DOCUMENTS

| | | | |
|---|---|---|---|
| 2004/0218891 A1* | 11/2004 | Clark | 385/147 |
| 2004/0236620 A1* | 11/2004 | Chauhan et al. | 705/9 |
| 2005/0120296 A1* | 6/2005 | Zeuli | 715/507 |
| 2005/0149372 A1* | 7/2005 | Kite et al. | 705/8 |
| 2005/0149561 A1* | 7/2005 | Hodnett et al. | 707/104.1 |
| 2005/0165734 A1* | 7/2005 | Vicars et al. | 707/2 |
| 2005/0278386 A1* | 12/2005 | Kelly et al. | 707/200 |
| 2007/0061180 A1* | 3/2007 | Offenberg | 705/8 |

OTHER PUBLICATIONS

L. C. Liu. "Design Data Management in a CAD Framework Environment." 1990 IEEE. pp. 156-161.*

Applicants' statement regarding a workflow management system for an RMC core team in Information Disclosure Statement.

Applicants' statement regarding a workflow management system for RMC jobs workflow in Information Disclosure statement.

Applicants' statement regarding a workflow managment system for CORMC workflow in Infomation Disclosure statement.

Applicants' statement regarding a workflow management system for LMU requests in Information Disclosure statement.

Patent Application entitled "Split Plat Assignment and Management System"; filed Dec. 5, 2003; U.S. Appl. No. 10/729,252.

Patent Application entitled "Fiber Splice Assignment and Management System"; filed Dec. 5, 2003; U.S. Appl. No. 10/729,496.

Colan, Giovanna B., Non-Final Office Action mailed May 19, 2006, U.S. Appl. No. 10/729,496, filed Dec. 5, 2003.

Colan, Giovanna B., Final Office Action mailed Nov. 1, 2006, U.S. Appl. No. 10/729,496, filed Dec. 5, 2003.

Thornton; U.S. Appl. No. 10/729,496, filed Dec. 5, 2003.

Thornton; U.S. Appl. No. 10/729,252, filed Dec. 5, 2003.

O'Neil; U.S. Appl. No. 10/431,829, filed May 8, 2003.

Thornton; Non-Final Office Action mailed May 19, 2006; U.S. Appl. No. 10/729,496, filed Dec. 5, 2003.

Thornton; Examiner Interview Summary Record mailed Aug. 18, 2006; U.S. Appl. No. 10/729,496, filed Dec. 5, 2003.

Thornton; Final Office Action mailed Nov. 1, 2006; U.S. Appl. No. 10/729,496, filed Dec. 5, 2003.

O'Neil; Non- Final Rejection mailed Dec. 12, 2006; U.S. Appl. No. 10/431,829, filed May 8, 2003.

O'Neil; Final Rejection mailed May 30, 2007; U.S. Appl. No. 10/431,829, filed May 8, 2003.

O'Neil; Advisory Action mailed Aug. 13, 2007; U.S. Appl. No. 10/431,829, filed May 8, 2003.

O'Neil; Examiner Interview Summary Record mailed Nov. 13, 2007; U.S. Appl. No. 10/431,829, filed May 8, 2003.

O'Neil; Non- Final Rejection mailed Nov. 13, 2007; U.S. Appl. No. 10/431,829, filed May 8, 2003.

* cited by examiner

WEST FIBER CONVERSION MENU

START PRINTING WIRECENTER —222
224— ASSIGN WIRECENTER
226— MARK WIRECENTER COMPLETE
228— WIRECENTER PRINTING REPORT
230— VIEW AVAILABLE WIRECENTERS
232— VIEW YOUR ASSIGNED WIRECENTERS
234— VIEW ALL ASSIGNED WIRECENTERS
236— VIEW COMPLETED WIRECENTERS
238— VIEW ALL ACCEPTED WIRECENTERS
240— FIBER CONVERSION SUMMARY

RETURN TO MAIN MENU

KEY IN SPLAT REQUEST

THIS FORM IS USED TO DOCUMENT CONGESTED PLATS THAT NEED SPLATTING. THERE IS NO GUARANTEED TURN-AROUND TIME ON SPLAT COMPLETIONS ENTERED HERE.

DISTRICT:
305 — SELECT A DISTRICT / NORTH AL / BROWARD FL / CENTRAL FL / NORTH GA

WIRE CENTER NAME:
310

PLAT NAME:
315

YOUR ID:
320

DATE REQUESTED: 2003-06-17

ON CLICKING SUBMIT YOU WILL BE RETURNED TO THIS SCREEN TO ENTER ANY OTHER PLATS. THERE WILL BE NO CONFIRMATION SCREEN.

325 — SUBMIT SPLAT REQUEST

SPLAT FILE FRONT PAGE

SPLAT REQUEST FORM

SPLAT JOB NUMBER: S19483213
NPA: 994                    NNX: 431
DISTRICT: BROWARD           WIRECENTER: PEMBROKE PINES

DATE IDENTIFIED: 2003-07-14    DATE ASSIGNED: 2003-07-14
ORIGINAL PLAT: DI0109          ASSIGNED TO: JMK
                               TIME: _____
NEW PLATS: _____

| OLD UG/DETAIL | NEW UG/DETAIL |
|---|---|
|  |  |
|  |  |
|  |  |
|  |  |
|  |  |
|  |  |
|  |  |
|  |  |

RENAMES DONE BY: _____    DATE: _____
DETAIL PLATS ELIMINATED: ☐ YES   ☐
LIST DETAIL PLATS: _____  NO
                   _____
PRINT CREDIT: 24    ADDITIONAL DETAIL CREDIT: _____
APPROVED: _____  DATE: _____

FIG. 6                         ⤺ 600

OPEN SPLAT JOBS

| PRIORITY | JOB NO. | WIRECENTER | NPA | NNX | PLAT | ASSIGNED | ASSIGNED TO | AGE |
|---|---|---|---|---|---|---|---|---|
| NORMAL | S15375352 | RIDGEWOOD | 904 | 272 | DI0619B | 2003-06-03 | WMR | 14 |
| NORMAL | S153150643 | PALMETTO | 305 | 591 | DI0304 | 2003-06-03 | AMB | 14 |
| NORMAL | S13984036 | HIALEAH | 305 | 821 | DI0502D | | | 28 |
| NORMAL | S133122352 | WESCONNET | 904 | 771 | DI0809 | | | 34 |
| NORMAL | S15375352 | WESCONNET | 904 | 771 | DI0807 | | | 34 |
| NORMAL | S15375352 | GREENACRES | 561 | 995 | DI1633 | | | 46 |
| NORMAL | S15375352 | GREENACRES | 561 | 995 | DI2320 | | | 47 |
| NORMAL | S15375352 | DELRAY_BC | 561 | 272 | DI0210 | 2003-04-29 | PRT | 48 |
| NORMAL | S15375352 | HIALEAH | 305 | 812 | DI0404 | | | 50 |
| NORMAL | S15375352 | FLAGLER_BC | 386 | 429 | DI0938 | | | 54 |
| NORMAL | S15375352 | BEACHLAND | 772 | 231 | DI2240 | | | 60 |

BACK TO SPLAT MENU

FIG. 8

ASSIGNED SPLAT JOBS BY ID

| PRIORITY | JOB NO. | WIRECENTER | NPA | NNX | PLAT | ASSIGNED | COMPLETED |
|---|---|---|---|---|---|---|---|
| NORMAL | S15375352 | RIDGEWOOD | 904 | 272 | DI0619B | 2002-10-10 | 2002-10-21 |
| NORMAL | S153150643 | PALMETTO | 305 | 591 | DI0304 | 2002-10-10 | 2001-10-21 |
| NORMAL | S13984036 | HIALEAH | 305 | 821 | DI0502D | 2002-10-10 | 2003-01-09 |
| NORMAL | S133122352 | WESCONNET | 904 | 771 | DI0809 | 2002-10-11 | 2002-10-23 |
| NORMAL | S15375352 | WESCONNET | 904 | 771 | DI0807 | 2002-10-17 | 2002-10-23 |
| NORMAL | S15375352 | GREENACRES | 561 | 995 | DI1633 | 2002-11-21 | 2003-11-27 |
| NORMAL | S15375352 | GREENACRES | 561 | 995 | DI2320 | 2002-12-04 | 2002-12-18 |
| NORMAL | S15375352 | DELRAY_BC | 561 | 272 | DI0210 | 2003-01-02 | 2003-01-06 |
| NORMAL | S15375352 | HIALEAH | 305 | 812 | DI0404 | 2003-01-02 | 2003-01-06 |
| NORMAL | S15375352 | FLAGLER_BC | 386 | 429 | DI0938 | 2003-01-15 | 2003-01-21 |
| NORMAL | S15375352 | BEACHLAND | 772 | 231 | DI2240 | 2003-01-16 | 2003-01-21 |

TOTAL: 11

BACK TO SPLAT MENU

FIG. 10

FIBER CONVERSION - WIRECENTER PRINTING REPORT

| STATE | DISTRICT | WC | CLLI_CODE | AVAILABLE | PRINT START | QRTL | UNITS |
|---|---|---|---|---|---|---|---|
| LA | CTLA | ABBEVILLE | ABVLLAMA | | 2003-08-13 | 1 | 338546 |
| AL | BMAL | ALABASTER | ALBSALMA | | 2003-08-13 | 1 | 609350 |
| LA | NOLK | ALBANY | ALBYLAMA | | 2003-08-12 | 3 | 120042 |
| AL | MGAL | ALEXANDER | ALCYALMT | | 2003-08-11 | 1 | 342345 |
| KY | ESKY | ALLEN | ALLNKYMA | | 2003-08-05 | 3 | 78906 |
| AL | NOAL | ALBERTVILLE | ALVLALMA | | 2003-08-22 | 2 | 231134 |
| LA | NOLA | DEVILLE | ANTNALMT | | 2003-08-06 | 3 | 113147 |
| LA | NOLK | ANGIE | ALCDLRBW | | 2003-08-11 | 4 | 25007 |
| AL | NOAL | ANNISTON | ARCDLAMA | | 2003-08-18 | 1 | 315608 |
| LA | NOLA | BIENVILLE | ASLDMSMA | | 2003-08-15 | 4 | 47377 |
| LA | NOLA | ARCADIA | ATHNALER | 2003-09-01 | 2003-08-06 | 2 | 157795 |

FIG. 12

FIBER CONVERSION - WIRECENTER AVAILABILITY REPORT

| STATE | DISTRICT | WC | CLLI_CODE | AVAILABLE | PRINT START | QRTL | UNITS |
|---|---|---|---|---|---|---|---|
| AL | BMAL | BHAM MAIN&T | BRHMALMT | 2003-09-05 | 2003-08-14 | 1 | 338546 |
| AL | MOAL | SPANISH FOR | MOBLALSF | 2003-09-05 | 2003-08-15 | 1 | 609350 |
| AL | MOAL | AZALEA | MOBLALAZ | 2003-09-05 | 2003-08-15 | 3 | 120042 |
| AL | MGAL | MILLBROOK | MTGMALMB | 2003-09-05 | 2003-08-11 | 1 | 342345 |
| AL | MOAL | BAYFRONT | MOBLALBF | 2003-09-05 | 2003-08-11 | 3 | 78906 |
| AL | MOAL | PRICHARD | MOBLALPR | 2003-09-05 | 2003-08-15 | 2 | 231134 |
| AL | MGAL | HOLTVILLE | HLVIALMA | 2003-09-05 | 2003-08-11 | 3 | 113147 |
| AL | MGAL | CHILDERSBER | CHBGALMA | 2003-09-05 | 2003-08-08 | 3 | 113147 |

TOTAL: 8

BACK TO MENU

| STATE | DIST. | WC | CLLI_CODE | AVAILABLE | PRINT START | ASSIGNED | ASSIGNED TO: | UNITS |
|---|---|---|---|---|---|---|---|---|
| AL | BMAL | FIVE POINTS | BRHMALFS | 2003-08-29 | 2003-06-29 | 2003-08-30 | MLK | 139110 |

TOTAL: 1

FIBER CONVERSION - WIRECENTER ASSIGNMENTS

| STATE | DIST. | WC | CLLI_CODE | AVAILABLE | PRINT START | ASSIGNED | ASSIGNED TO: | UNITS |
|---|---|---|---|---|---|---|---|---|
| AL | NOAL | ATHENS | ATHNALMA | 2003-09-04 | 2003-09-04 | 2003-09-04 | MLK | 445012 |
| AL | BMAL | FORESTDAL | BRHMALFO | 2003-08-29 | 2003-08-14 | 2003-08-30 | JTR | 63602 |
| AL | BMAL | FIVE POINTS | BRHMALFS | 2003-08-29 | 2003-08-29 | 2003-08-30 | MGM | 139110 |
| AL | NOAL | CULMAN | CLMNALMA | 2003-09-04 | 2003-09-04 | 2003-09-04 | RJR | 367506 |
| AL | NOAL | DECATUR | DCTRALMT | 2003-09-04 | 2003-09-04 | 2003-09-04 | JTR | 612824 |

TOTAL: 5

BACK TO MENU

FIG. 17

FIBER CONVERSION - COMPLETED WIRECENTERS

| STATE (1805) | DIST. (1810) | WC (1815) | CLLI_CODE (1820) | ASSIGNED (1825) | ASSIGNED TO (1830) | COMPLETED (1835) | HOURS (1840) | UNITS (1845) |
|---|---|---|---|---|---|---|---|---|
| AL | NOAL | ELK RIVER | ATHNALMA | 2003-09-01 | WTR | 2003-09-01 | 0.00 | 65564 |
| KY | WEKY | AURORA | BRHMALFO | 2003-08-25 | EKP | 2003-08-27 | 8.00 | 63463 |
| MS | SOMS | EDGEWATE | BRHMALFS | 2003-08-25 | TRR | 2003-09-03 | 32.00 | 247380 |
| AL | MOAL | BELLE FONT | CLMNALMA | 2003-08-26 | AIF | 2003-09-02 | 14.00 | 78075 |
| AL | NOAL | FAIRVIEW | DCTRALMT | 2003-09-01 | LMR | 2003-09-01 | 0.00 | 158691 |

TOTAL: 5  (1850)

BACK TO MENU

FIBER CONVERSION - ACCEPTED WIRECENTERS

| QRTL | STATE | DIST. | WC | CLLI_CODE | ACCEPTED | ACCEPTED BY |
|---|---|---|---|---|---|---|
| 3 | AL | NOAL | ELK RIVER | ATHNALER | 2003-09-11 | AUTO |
| 3 | KY | WEKY | AURORA | AURRKYMA | 2003-09-06 | AUTO |
| 2 | MS | SOMS | EDGEWATE | BILXMSED | 2003-09-11 | PCB |
| 3 | AL | MOAL | BELLE FONT | BFLNALMA | 2003-09-11 | PCB |
| 3 | AL | NOAL | FIVE POINTS | BRHMALFS | 2003-09-11 | PCB |

TOTAL: 5

BACK TO MENU

FIG. 19

FIBER CONVERSION - PROJECT SUMMARY

FIBER CONVERSION PROJECT SUMMARY

| QRTLS | WC | UNITS | PRINTING WCs | | AVAILABLE WCs | | ASSIGNED WCs | | COMPLETE WCs | | COMPLETE UNITS | | ACCEPTED WCs | |
|---|---|---|---|---|---|---|---|---|---|---|---|---|---|---|
| | | | # | % | # | % | # | % | # | % | # | % | # | % |
| I | 239 | 109143922 | 77 | 32.2 | 0 | 0 | 3 | 1.26 | 1 | 0.42 | 388288 | 0.36 | 0 | 0 |
| II | 239 | 47778215 | 78 | 32.6 | 0 | 0 | 0 | 0 | 6 | 2.51 | 1050970 | 2.2 | 0 | 0 |
| III | 239 | 25307545 | 89 | 37.2 | 0 | 0 | 1 | 0.42 | 7 | 2.93 | 668382 | 2.64 | 0 | 0 |
| IV | 247 | 11214489 | 103 | 37.2 | 0 | 0 | 1 | 0.41 | 1 | 0.41 | 69535 | 0.62 | 0 | 0 |
| TOTALS | 964 | 193444171 | 347 | 36 | 0 | 0 | 5 | 0.52 | 15 | 1.56 | 2177175 | 1.13 | 0 | 0 |

BACK TO MENU

```
┌─────────────────────────────────────────────────┐
│       FIBER SPLICE - SELECT A WC TO WORK        │
├─────────────────────────────────────────────────┤
│                                                 │
│   ┌─────────────────────────────────────────┐   │
│   │ SELECT A WIRECENTER TO WORK             │   │
│   ├─────────────────────────────────────────┤   │
│   │  PLEASE NOTE: ALL SELECTIONS ARE LISTED BY │
│   │  WIRECENTER AND DISTRICT. THE SORT ORDER IS BY│
│   │            WIRECENTER NAME.             │   │
│   │                                         │   │
│   │        SELECT WC TO BE ASSIGNED:        │   │
│   │                                         │   │
│   │          WIRECENTER -- DISTRICT         │   │
│   │  ┌──────────────────────────────────┬─┐│   │
│   │  │ MARGATE, BRWD                    │▽││   │
│   │  └──────────────────────────────────┴─┘│   │
│   │                               ╲─2205   │   │
│   │       ASSIGN TO: ┌──────────┐          │   │
│   │                  └──────────┘╲─2210    │   │
│   │           ┌──────────────────┐         │   │
│   │           │     SELECT       │         │   │
│   │           └──────────────────┘         │   │
│   │                      ╲─2215            │   │
│   └─────────────────────────────────────────┘   │
│                                                 │
│         BACK TO FIBER SPLICE TRACKING MENU      │
│                                                 │
└─────────────────────────────────────────────────┘

FIBER SPLICE - SELECT A WIRECENTER TO COMPLETE

SELECT A WC TO COMPLETE

PLEASE NOTE: ALL SELECTIONS ARE LISTED BY WIRECENTER, DISTRICT, ID, AND DATE ASSIGNED. THE SORT ORDER IS BY WIRECENTER NAME.

SELECT A WC TO BE MARKED COMPLETE:

WIRECENTER - DISTRICT - ID

VINEYARD_RD, CENC, ALB, 2003-07-28 ▽  —2405

2410 — MARK WC COMPLETE

BACK TO FIBER SPLICE TRACKING MENU

| WIRECENTER | NPA | NPX | ASSIGNED |
|---|---|---|---|
| VINEYARD_RD | 336 | 765 | 2003-06-29 |

FIBER SPLICE - JOBS ASSIGNED BY ID

TOTAL: 1

BACK TO FIBER SPLICE TRACKING MENU

FIG. 26

FIBER SPLICE - JOBS COMPLETED BY ID

FIBER SPLICE JOBS FOR ART

| WIRECENTER | NPA | NPX | COMPLETED |
|---|---|---|---|
| NEWBERRY | 806 | 276 | 2003-06-18 |
| VALE | 704 | 276 | 2003-06-12 |
| YORK | 803 | 684 | 2003-06-12 |
| WESTMINSTER | 864 | 647 | 2003-06-10 |

TOTAL: 4

BACK TO FIBER SPLICE TRACKING MENU

FIG. 28

| FIBER SPLICE - JOBS ASSIGNED TO RMC EAST ||||||
|---|---|---|---|---|---|
| FIBER SPLICE JOBS FOR RMC EAST ||||||
| WIRECENTER | NPA | NPX | ASSIGNED | NAME ||
| ARCH_CREEK | 305 | 940 | 2003-06-09 | MAM ||
| BEACH | 305 | 531 | 2003-08-05 | PHJ ||
| CHAMBLEE | 770 | 455 | 2003-07-30 | RBM ||
| CHAPEL_HILL | 919 | 929 | 2003-07-10 | FRK ||
| CLAY | 904 | 353 | 2003-07-02 | ROQ ||
| DERITA | 704 | 596 | 2003-08-20 | BRC ||
| DUTCH_FORK | 803 | 781 | 2003-08-05 | DDS ||
| DUTCH_FORK | 864 | 855 | 2003-07-24 | EAM ||
| DUTCH_FORK | 336 | 373 | 2003-06-09 | CAD ||

FIG. 29

| FIBER SPLICE - JOBS ASSIGNED TO RMC EAST | | | | | | |
|---|---|---|---|---|---|---|
| FIBER SPLICE JOBS FOR RMC EAST | | | | | | |
| ⌐3105 | ⌐3110 | ⌐3115 | ⌐3120 | ⌐3125 | ⌐3130 | ⌐3135 |
| WIRECENTER | NPA | NPX | COMPLETED | NAME | HOURS | PRINTS |
| AIRPORT | 305 | 526 | 2003-07-07 | RTT | 63.00 | 252.00 |
| AIRPORT | 954 | 359 | 2003-06-11 | MBJ | 16.00 | 64.00 |
| ALHAMBRA | 305 | 442 | 2003-07-29 | GPB | 88.50 | 354.00 |
| ARCHER | 352 | 495 | 2003-06-12 | MJT | 2.50 | 10.00 |
| ARLINGTON | 904 | 721 | 2003-06-16 | GWB | 42.00 | 168.00 |
| ATLANTIC_BCH | 904 | 221 | 2003-06-12 | ROR | 26.00 | 104.00 |
| AVENUES | 904 | 363 | 2003-06-16 | RMN | 19.00 | 76.00 |
| AZALEA_PARK | 407 | 273 | 2003-08-05 | JPC | 127.00 | 508.00 |
| BALDWIN | 904 | 266 | 2003-08-04 | GHW | 30.00 | 120.00 |

DRAWING CONVERSION ASSIGNMENT AND MANAGEMENT SYSTEM

TECHNICAL FIELD

The present disclosure relates generally to telecommunications, and more particularly to managing and tracking changes to a telecommunications network.

DESCRIPTION OF THE RELATED ART

In order to stay current with demand, telecommunications networks have grown at an exponential rate. This is especially true for common local exchange carriers (CLECs/common carriers), which are required by federal law to service any demand, even when costs would normally be prohibitive. Moreover, these common carriers must maintain capacity and plan for this ever-increasing demand, and supply leased-line bandwidth to competitors. Thus, the telecommunications network is ever evolving to meet the needs and demands of consumers.

Carriers have developed various procedures over the years to respond to their customers. In particular, a network operations center (NOC) includes engineers who typically generate engineering work-orders (EWOs). The EWOs are typically sent to a record maintenance center (RMC) group, typically consisting of a number of draftsmen, and a construction group. The RMC group is typically where the engineering work order is pre-posted. Pre-posting typically includes altering the existing drawing records. Outside plant construction management then typically builds the changes into the network. Upon making the changes, outside plant construction management typically closes the job in job management system (JMS). The designing engineer can then approve the drawings and send the changes back to the RMC, and the RMC can final-post drawings. Final posting typically involves checking the construction against the work order and resolving any differences. These changes can involve 15,000 jobs per month, in one example, among others. This volume can result in significant backlogs of up to many years for some RMCs. Therefore, there is a need for systems and methods that address these and/or other perceived shortcomings of the prior art.

SUMMARY OF THE DISCLOSURE

One embodiment, among others, of the present disclosure provides for a drawing conversion assignment and management system. A representative system, among others, can include receiving logic, a database, assignment logic, and completion logic. The receiving logic typically receives notification of completion of a land base drawing file. The database creates a drawing conversion job record associated with the land base drawing file. The assignment logic assigns the drawing conversion job record to a draftsman and instructs the database to record the assignment. The completion logic typically receives a request to close the drawing conversion job record, and instructs the database to mark the drawing conversion job record as closed.

The present disclosure also provides methods for assigning and managing drawing conversions. A representative method, among others, can include the following steps: receiving notification that a land base drawing file is available, the land base drawing file being associated with a wire-center; creating a drawing conversion job record associated with the land base drawing file; storing the drawing conversion job record in a database; assigning the drawing conversion job record to a draftsman; recording the assignment of the drawing conversion job record in the database; and closing the job upon receipt of a close request, by marking the drawing conversion job record as closed in the database.

Other systems, methods, and/or computer programs products according to embodiments will be or become apparent to one with skill in the art upon review of the following drawings and detailed description. It is intended that all such additional system, methods, and/or computer program products be included within this description, and be within the scope of the present disclosure.

BRIEF DESCRIPTION OF THE FIGURES

The disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 2B is a sample screen shot of an embodiment, among others, of a drawing conversion menu screen representation of the TRAKS application of FIG. 1B.

FIG. 3 is a sample screen shot of an embodiment, among others, of a split plat (SPLAT) request screen representation of the TRAKS application of FIG. 1B.

FIG. 6 is a sample screen shot of an embodiment, among others, of a split plat file front page screen representation of the TRAKS application of FIG. 1B.

FIG. 8 is a sample screen shot of an embodiment, among others, of a split plat open jobs reporting screen representation of the TRAKS application of FIG. 1B.

FIG. 10 is a sample screen shot of an embodiment, among others, of a split plat open jobs reporting by ID screen representation of the TRAKS application of FIG. 1B.

FIG. 12 is a sample screen shot of an embodiment, among others, of a fiber conversion wirecenter printing report screen representation of the TRAKS application of FIG. 1B.

FIG. 13 is a sample screen shot of an embodiment, among others, of a fiber conversion wirecenter availability report screen representation of the TRAKS application of FIG. 1B.

FIG. 17 is a sample screen shot of an embodiment, among others, of a fiber conversion wirecenter availability report screen representation of the TRAKS application of FIG. 1B.

FIG. 18 is a sample screen shot of an embodiment, among others, of a fiber conversion completed wirecenters report screen representation of the TRAKS application of FIG. 1B.

FIG. 19 is a sample screen shot of an embodiment, among others, of a fiber conversion accepted wirecenters report screen representation of the TRAKS application of FIG. 1B.

FIG. 20 is a sample screen shot of an embodiment, among others, of a fiber conversion summary screen representation of the TRAKS application of FIG. 1B.

FIG. 22 is a sample screen shot of an embodiment, among others, of a fiber splice assignment screen representation of the TRAKS application of FIG. 1B.

FIG. 24 is a sample screen shot of an embodiment, among others, of a fiber splice completion screen representation of the TRAKS application of FIG. 1B.

FIG. 26 is a sample screen shot of an embodiment, among others, of a fiber splice reporting by ID screen representation of the TRAKS application of FIG. 1B.

FIG. 28 is a sample screen shot of an embodiment, among others, of a fiber splice completed jobs reporting screen representation of the TRAKS application of FIG. 1B.

FIG. 29 is a sample screen shot of an embodiment, among others, of a fiber splice reporting by records maintenance center screen representation of the TRAKS application of FIG. 1B.

FIG. 31 is a sample screen shot of an embodiment, among others, of a fiber splice records maintenance center reporting screen representation of the TRAKS application of FIG. 1B.

DETAILED DESCRIPTION

Figure 1A:
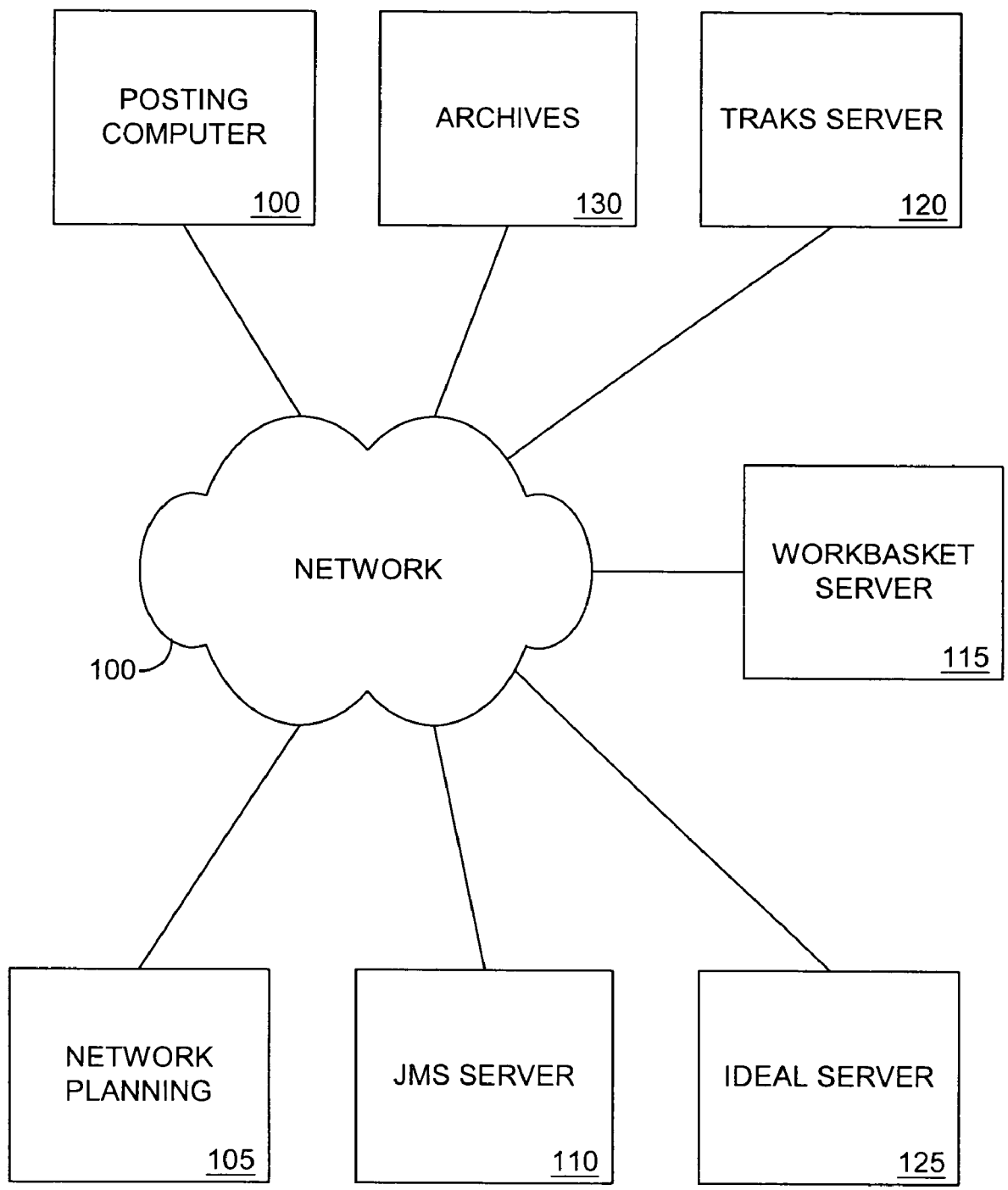
FIG. 1A is a block diagram of an embodiment, among others, of a tracking and assignment system of the present disclosure.

Embodiments of the disclosure now will be described more fully with reference to the accompanying drawings. The disclosure may, however, be embodied in many different forms and should not be construed as limited to the embodiments set forth herein; rather, these embodiments are intended to convey the scope of the disclosure to those skilled in the art. Furthermore, all "examples" given herein are intended to be non-limiting.

Referring now to FIG. 1, shown is a block diagram of a typical network 100 in which an embodiment, among others, of the present disclosure can be employed. Network planning 105 typically includes a group of engineers in charge of changes to a telecommunications network infrastructure. An example, among others, of an item causing such changes is a new service request, such as when a new subdivision or new home is being built. The changes can also be upgrades to the network to deal with existing traffic, future plans, reconfiguration of the infrastructure, etc. One skilled in the art should recognize that there exist myriad reasons why telecommunications network infrastructure changes.

When planning a change to the telecommunications network infrastructure, engineers at the network planning 105 typically request a drawing from drawings archives 130 using a program such as Map Viewer, available from Byers Engineering, of Atlanta, Ga. Using the Map Viewer program, the engineer pulls a drawing by copying it onto a local computer (not shown) and can typically redline with changes the plat drawing pulled using a CAD program, but this does not make changes to the official record of the plat. Upon making the changes and calculating costs, the engineer will typically launch the change request to a supervisor through a job management system (JMS) 110, such as one available from CEYONIQ, Inc., of Herndon, Va. (world headquarters in Bielefeld, Germany), as one example among others. The supervisor typically reviews the changes and either approves the changes or denies the request using JMS 110. Typically, if the supervisor denies the request, he or she will suggest an alternative to the requesting engineer, and the engineer submits an altered request.

Upon approval by the supervisor, the work order is typically automatically launched by JMS 110 to a records maintenance center (RMC) workbasket. The RMC workbasket is a database directory associated with the RMC group that typically resides on a centralized workbasket server 115, which may be co-located with the JMS server 110 (though drawn separately for clarity). A pre-posting receipt worker in the RMC group typically retrieve jobs from the workbasket server 115 at various intervals using a workstation (not shown). The pre-posting receipt worker receipts these jobs by printing the jobs and entering them into a tracking reporting and knowledgebase system (TRAKS) server(s) 120 of the present disclosure. The TRAKS servers 120 in some implementations, among others, of the present invention, can include interfaces to barcode scanners, printers, label software, as well as legacy software applications.

TRAKS 120 typically already has a record of jobs that are expected to be in the workbasket 115 because it retrieves newly approved job numbers from a job number assignment application, one example, among others, of such an application is an IDEAL application 125, which is available from BellSouth of Atlanta, Ga. IDEAL 125 is a legacy system that assigns job numbers to JMS 110 when an engineer at network support 105 gets approval for a new project. Thus, TRAKS 120 can determine any irregularities between the job numbers that have been approved and the copies actually received via the JMS workbasket 115. If a job has been approved and not receipted into TRAKS 120, a manager can be made aware of this fact through TRAKS 120, whereas it was previously impractical to determine whether a copy of a job was supposed to be received.

The process of receipting a job into TRAKS 120 typically includes reviewing the job and determining the difficulty level of the job, and the number of pages that require posting. Because posting staff employees in an embodiment, among others, of TRAKS work on contract (e.g. are paid by a separate entity according to a per piece, or credit system), the difficulty level and number of pages requiring posting determine the credit that a poster (posting staff employee) will receive for posting a particular job. Typically TRAKS allows the user to select the job number and enter the difficulty and the post-able pages. The employee receipting the job typically also prints a barcode label representing the job number of the job using TRAKS, and a front sheet containing the pertinent information about the job (i.e. NPA, NNX, district, wirecenter etc.).

After receipting a job, the employee doing the receipting typically takes the hard copies, labels, and front sheets to a file clerk. The file clerk assembles the file and puts it into a file room. Assembling the file typically involves attaching the label to a file folder, and inserting the front sheet and hard copy into the file folder. The file clerk then places the file into the file room for later retrieval by a pre-posting employee (pre-poster) or team leader.

Typically a team-leader for a pre-posting group will retrieve a number of pre-post jobs from the file room by assigning a number of files to members of his or her group using the members' respective identification codes. The team-leader typically assigns the files, one file per job, to his or her team members (pre-posters) by scanning the file using a barcode scanner, and entering an identification code for a group member into TRAKS. Typically, TRAKS also retrieves data from IDEAL that indicates that a job has been canceled by network planning 105, such that a user is made aware of the fact that a job has been canceled before pre-posting the job associated with that job number. Jobs can be canceled for numerous reasons, including cancellation by the customer, not enough funds, cutbacks, etc.

Then a pre-poster receives the files that were assigned to his or her identification code. After being assigned a job, the pre-poster has a period of time to complete the job. The pre-poster will then typically enter the drawing changes into a computer assisted drawing (CAD) program, such as Engineering Work Order (EWO) system (not shown). EWO is an intelligent, Oracle-based database program available from Byers Engineering, of Atlanta, Ga., and one skilled in the art should recognize that Oracle is available from Oracle Corporation of Redwood Shores, Calif. The EWO system provides data to the pre-poster's computer from the drawings archives 130, and allows the pre-poster to change the EWO drawings. Upon completing the job, the pre-poster turns the job into his or her supervisor. The supervisor then scans the barcode and selects a TRAKS option to close the pre-post job.

Outside plant construction then picks up the job from the RMC. Outside plant construction typically includes a Outside Plant Construction Management (OSPCM) system that aids the outside plant construction employees. After completing construction on a job, construction uses OSPCM to close a job, and the RMC uploads the OSPCM closing information into a TRAKS final post receipt table. The RMC then waits for someone from network planning to review the construction and reconcile any changes in an as-built drawing (as provided by the construction group) in a CAD program.

After network planning has reviewed a completed job the network planning engineer manually launches the as-built drawing(s) to the RMC's JMS workbasket 115, and the RMC receives approval (in the form of the OSPCM closing information, which was previously discussed) from network planning to perform a final posting on the job. The receipt process is similar to the process for receiving a pre-post job with drawings. However, the final posting typically includes a reconciliation by a draftsman (poster) of the changes shown in the original engineering drawings that were pre-posted against the changes shown in the as-built drawing. Any differences are added into the final post drawings and the file is then sent to the drawings archive 130. In particular, paper copies are typically sent to an archiving facility associated with a regional bell operating company (RBOC), while electronic copies are sent, for example, among others, to a JMS Docutrieve archive. Docutrieve is available from CEYONIQ, Inc., of Herndon, Va. (world headquarters in Bielefeld, Germany), and is a software product intended to be used with JMS. One skilled in the art should recognize that the disclosure is not intended to be limited to RBOCs, but could include other entities that build and maintain drawings or blueprints.

Figure 1B:
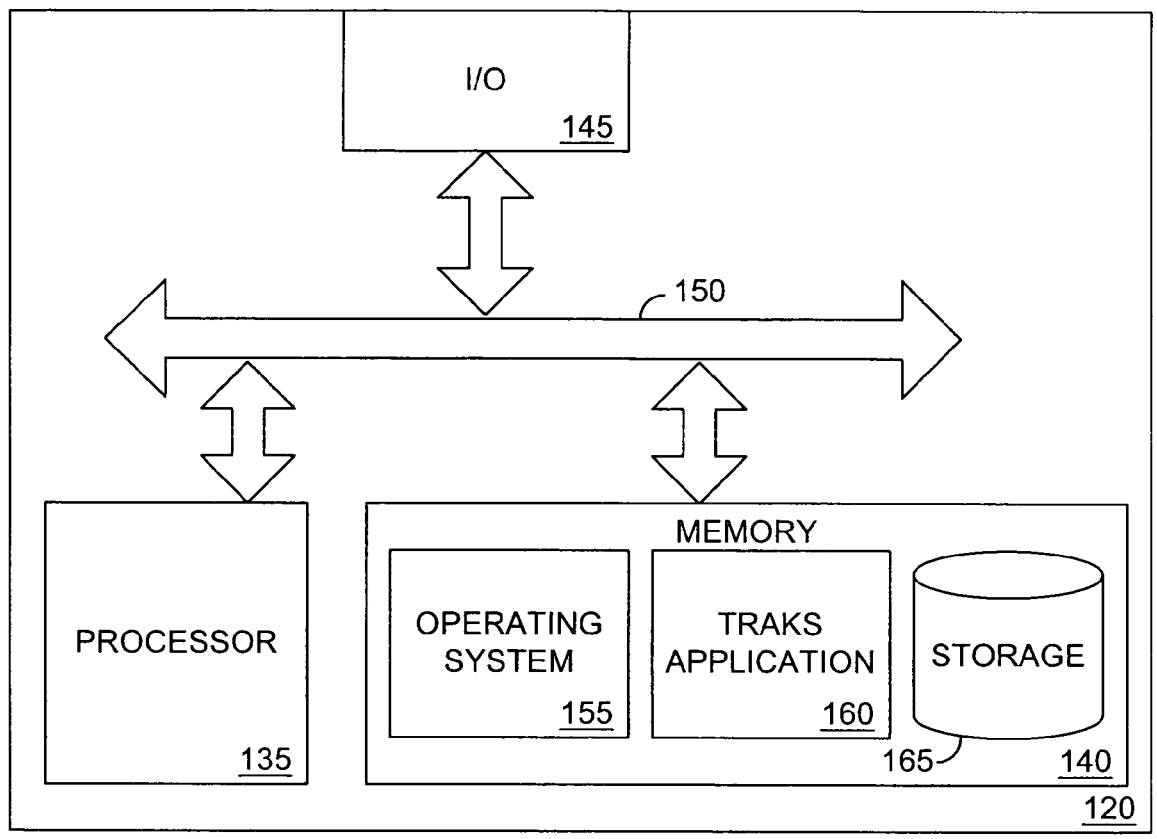
FIG. 1B is a generic block diagram of an embodiment, among others, of a tracking and assignment system server of FIG. 1.

Referring now to FIG. 1B, shown is a block diagram of an embodiment, among others, of the TRAKS server 120 shown in FIG. 1A. Generally, in terms of hardware architecture, as shown in FIG. 1B, the TRAKS server 120 includes a processor 135, memory 140, and one or more input and/or output (I/O) devices 145 (or peripherals) that are communicatively coupled via a local interface 150. The local interface 150 is, for example, among others, one or more buses or other wired or wireless connections, as is known in the art. The local interface 150 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 135 is a hardware device for executing software, particularly that stored in memory 140. The processor 135 can be any custom made or commercially available processor, a central processing unit (CPU), an auxiliary processor among several processors associated with the DSL modem 140, a semiconductor based microprocessor (in the form of a microchip or chip set), a macroprocessor, or generally any device for executing software instructions.

The memory 140 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 140 may incorporate electronic, magnetic, optical, and/or other types of storage media. Note that the memory 140 can have a distributed architecture, where various components are situated remote from one another, but can be accessed by the processor 140.

The software in memory 140 may include one or more separate programs 155, 160, each of which comprises an ordered listing of executable instructions for implementing logical functions. In the example of FIG. 1B, the software in the memory 140 includes the TRAKS server application 160 and a suitable operating system (O/S) 155. The operating system 155 essentially controls the execution of other computer programs, such as the TRAKS server application 160, and provides scheduling, input-output control, memory management, and communication control and related services.

In one embodiment, among others, of the present disclosure, the TRAKS server application 160 is provided to users in a hyper-text markup language format. One skilled in the art should recognize that in alternative embodiments, among others, the TRAKS server application is a source program, executable program (object code), script, or any other entity comprising a set of instructions to be performed. When a source program, then the program needs to be translated via a compiler, assembler, interpreter, or the like, which may or may not be included within the memory 140, so as to operate properly in connection with the O/S 160. Furthermore, the TRAKS application 160 in some implementations, among others, is written as (a) an object oriented programming language, which has classes of data and methods, or (b) a procedure programming language, which has routines, subroutines, and/or functions, for example but not limited to, C, C++, Pascal, Basic, Fortran, Cobol, Perl, Java, PHP, and Ada.

The I/O devices 145 typically includes input devices, for example but not limited to, an RJ-45 or RJ-11 jack for sending/receiving a DSL signal to/from a CO 125 and an ethernet or universal serial bus (USB) jack for sending/receiving the DSL signal to/from the computer 100. Finally, the I/O devices 145 may further include devices that communicate both inputs and outputs, for instance but not limited to, a radio frequency (RF) or other transceiver, a telephonic interface, a bridge, a router, etc.

When the TRAKS server 120 is in operation, the processor 135 is configured to execute software stored within the memory 140, to communicate data to and from the memory 140, and to generally control operations of the DSL modem 105 pursuant to the software. The TRAKS application 160 and the O/S 155, in whole or in part, but typically the latter, are read by the processor 135, perhaps buffered within the processor 135, and then executed.

When the TRAKS application 160 is implemented in software, as is shown in FIG. 1B, it should be noted that the TRAKS application 160 can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The TRAKS application 160 may be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

The TRAKS application 160 shown operates to assist in assigning work and collecting status information regarding projects and/or jobs that have been assigned to an RMC. In one embodiment, among others, drawings are being created/modified, and TRAKS helps to manage the assignment of the creation/modification work. Moreover, the TRAKS program 160 stored and executed on the TRAKS server 120 could assist in handling the considerable backlogs and congested plats present at most RBOC RMCs.

The TRAKS application 160, in one embodiment, among others is programmed to provide a number of dynamic, html-based web pages for remote users. Alternatively, the TRAKS application 160 is configured as a server application which can be remotely run and accessed by a manager/supervisor/draftsman. In this alternative embodiment, among others, the TRAKS server 120 would provide a stream of information (including formatting information) to the remote user's computer via the network 100.

Figure 2A:
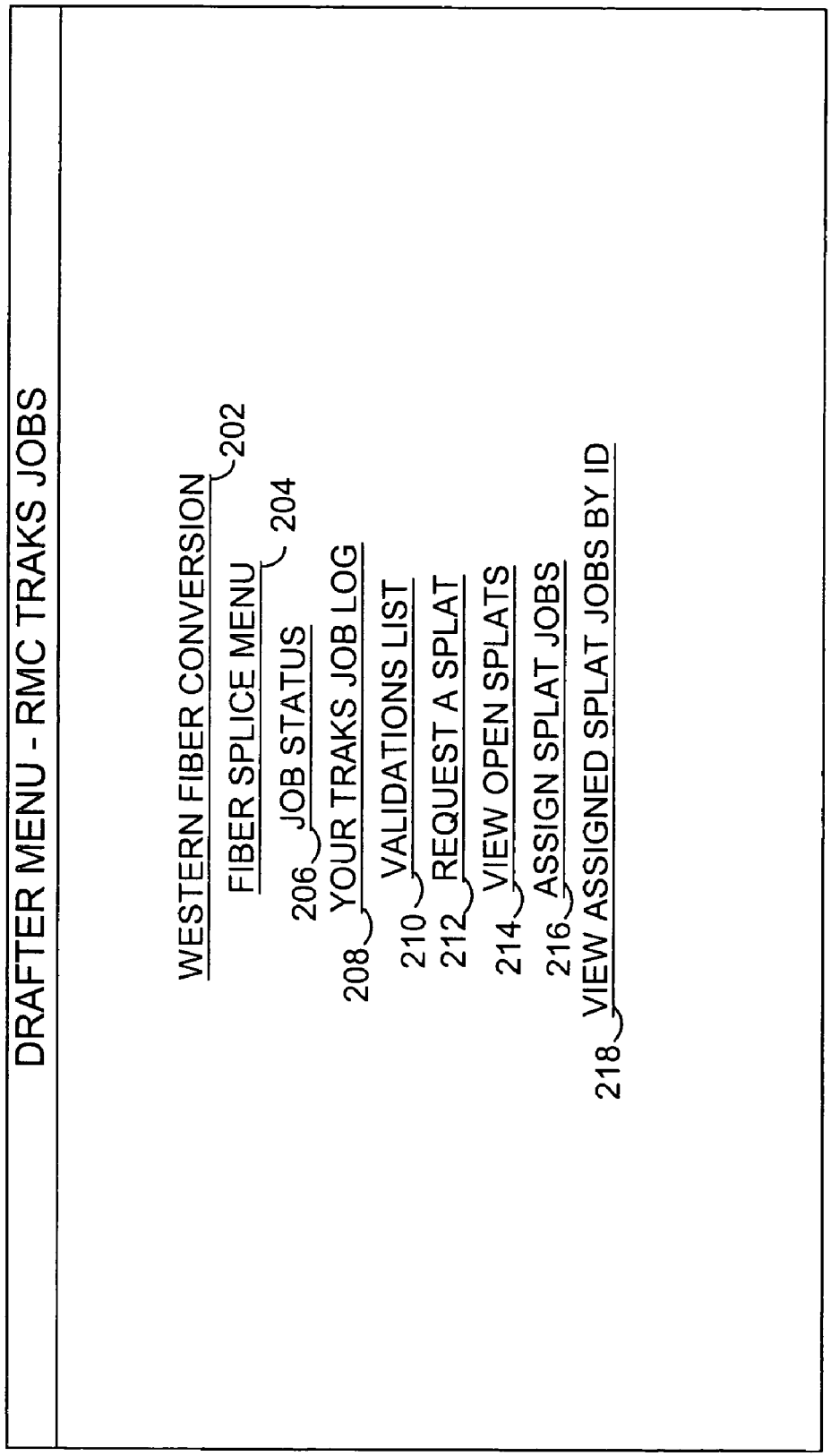
FIG. 2A is a sample screen shot of an embodiment, among others, of a main menu screen representation of the TRAKS application of FIG. 1B.
Figure 5:
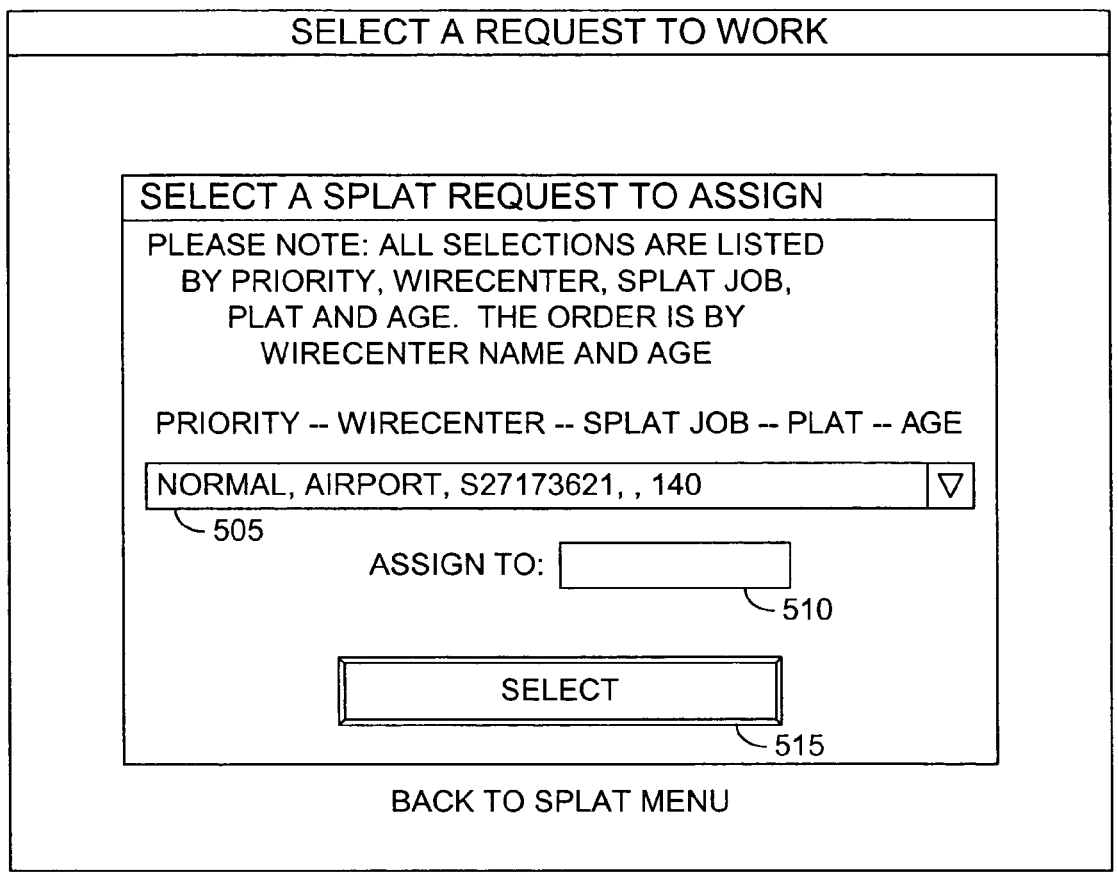
FIG. 5 is a sample screen shot of an embodiment, among others, of a split plat assignment page screen representation of the TRAKS application of FIG. 1B.
Figure 9:
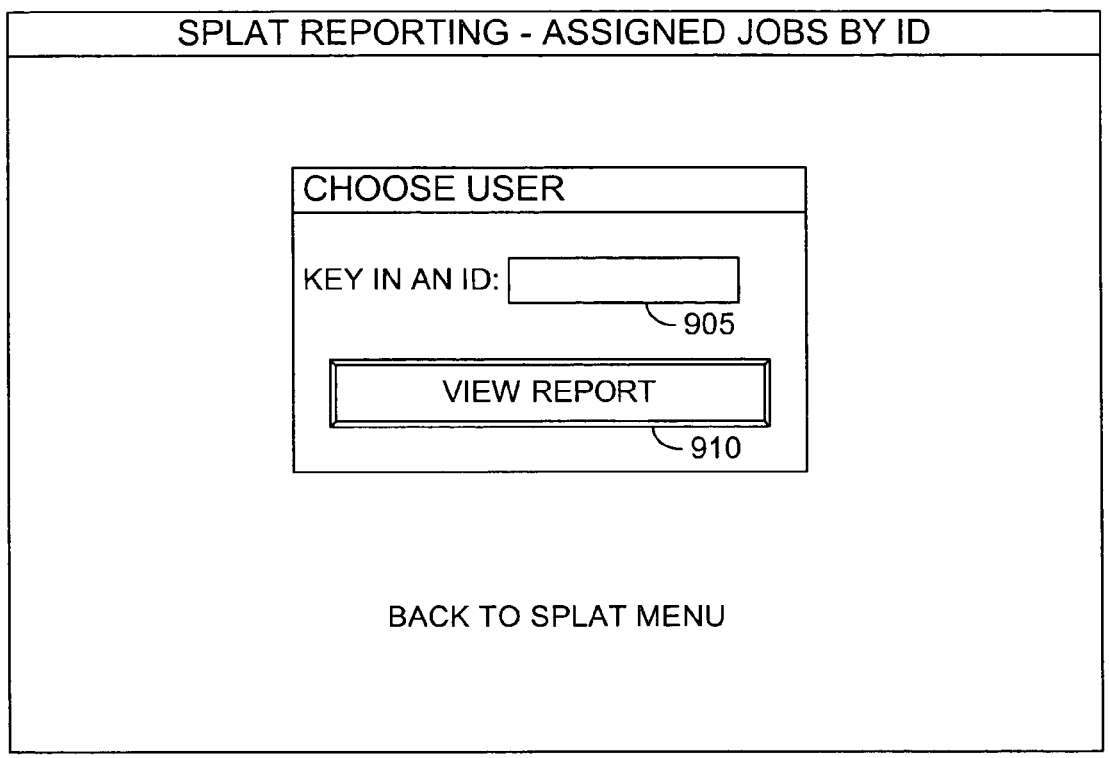
FIG. 9 is a sample screen shot of an embodiment, among others, of a split plat open jobs by ID reporting screen representation of the TRAKS application of FIG. 1B.

Referring now to FIG. 2A, shown is a screen shot of an embodiment, among others, of a menu screen representation 200. The menu screen representation typically includes a number of link representations. A user who wishes to use one of the features of TRAKS typically selects the link representation by moving the mouse cursor representation (not shown) over the link representation and pressing a mouse button. The link representations in an embodiment, among others, of the present disclosure include: a "Western Fiber Conversion" link representation 202; a "Fiber Splice Menu" link representation 204; a "Job Status" link representation 206; a "View Your TRAKS Jobs" link representation 208; a "Validations List" link representation 210; a "Request a Splat" link representation 212; a "View Open Splats" link representation 214; an "Assign Splat Jobs" link representation 216; and, a "View Assigned Splat Jobs by ID" link representation 218. The "Western Fiber Conversion" link representation 202 when selected leads the user to a western fiber conversion menu page representation shown in FIG. 2B. The "Fiber Splice Menu" link representation 204 when selected leads the user to a fiber splice menu representation shown in FIG. 2C. The "Job Status" link representation 206 when selected enables the user to view the status of various jobs assigned to the user. The "Your TRAKS job log" link representation 208 when selected enables the user to view a log of his or her open jobs. The "Validations" link representation 210 when selected enables the user to view a validations screen representation that notifies the user whether to run validations when posting an authorization. The "Request a Splat" link representation 212, when selected, enables the user to request a split plat job be performed by the RMC personnel in accordance with FIG. 3. The "View Open Splats" link representation 214 enables a user to view open splat requests in accordance with FIGS. 7 and 8. The "Assign Splat Jobs" link representation 216, when selected, enables users to assign split plat jobs to a user identification code as shown in FIG. 5. The "View Assigned Splat Jobs by ID" link representation 218, when selected, enables users to view assigned split plat jobs by identification code as shown in FIGS. 9 and 10.

Figure 14:
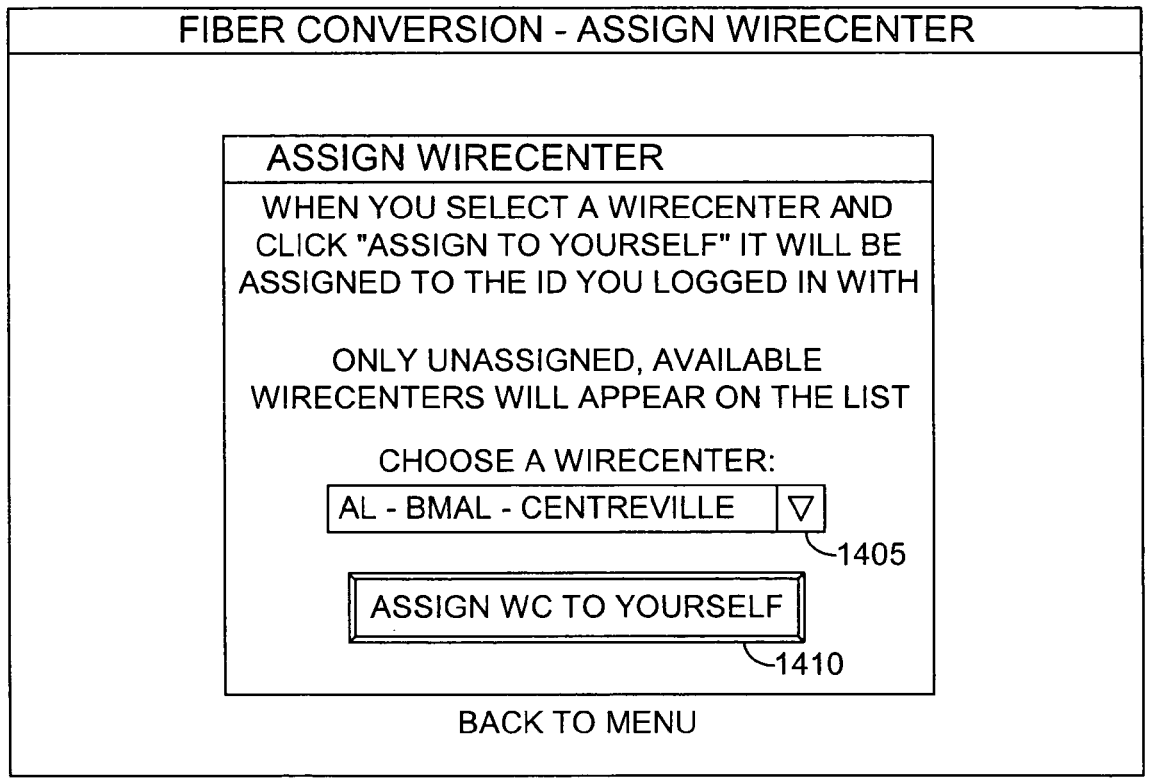
FIG. 14 is a sample screen shot of an embodiment, among others, of a fiber conversion wirecenter assignment screen representation of the TRAKS application of FIG. 1B.
Figure 15:
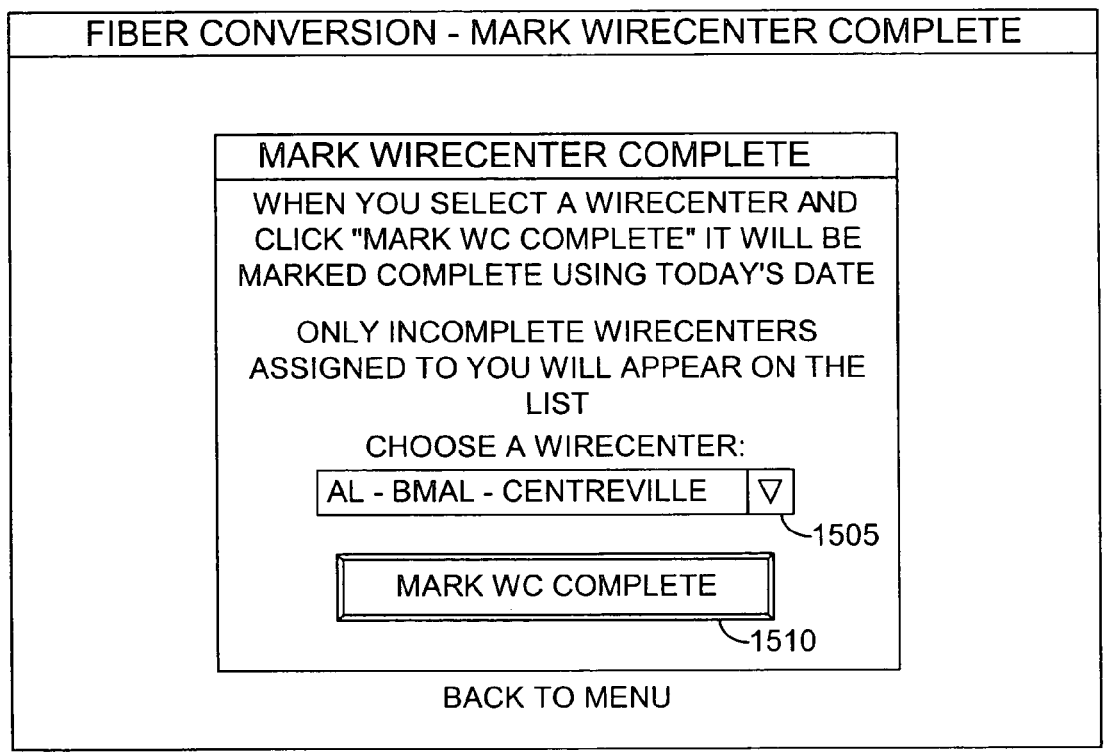
FIG. 15 is a sample screen shot of an embodiment, among others, of a fiber conversion wirecenter completion screen representation of the TRAKS application of FIG. 1B.
Figure 16:
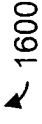
FIG. 16 is a sample screen shot of an embodiment, among others, of a split plat (SPLAT) request screen representation of the TRAKS application of FIG. 1B.

Referring now to FIG. 2B, shown is a screen shot of an embodiment, among others, of a west fiber conversion menu screen representation 216. A user would typically access this page by selecting the "West Fiber Conversion" link representation 202 of FIG. 2A. The user would then be present with a number of link representations 218-236. A "Start Printing Wirecenter" link representation 218 requests a print wirecenter screen representation, shown in FIG. 11, from the TRAKS application 160. An "Assign Wirecenter" link representation 220 requests an assign wirecenter screen representation as shown in FIG. 14. A "Mark Wirecenter Complete" link representation 222 requests a mark wirecenter complete screen representation as shown in FIG. 15. A "Wirecenter Printing Report" link representation 224 request a wirecenter printing report screen representation as shown in FIG. 12. A "View Available Wirecenters" link representation 226 requests a view available wirecenters screen representation as shown in FIG. 13. A "View Your Assigned Wirecenters" link representation 228 requests an assigned wirecenters screen representation as shown in FIG. 16. A "View All Assigned Wirecenters" link representation 230 requests a view assigned wirecenters screen representation as shown in FIG. 17. A "View Completed Wirecenters" link representation 232 requests a completed wirecenters screen representation as shown in FIG. 18. A "View Accepted Wirecenters" link representation 234 requests an accepted wirecenters screen representation as shown in FIG. 19. A "Fiber Conversion Summary" link representation 236 requests a project summary screen representation as shown in FIG. 20.

Figure 2C:
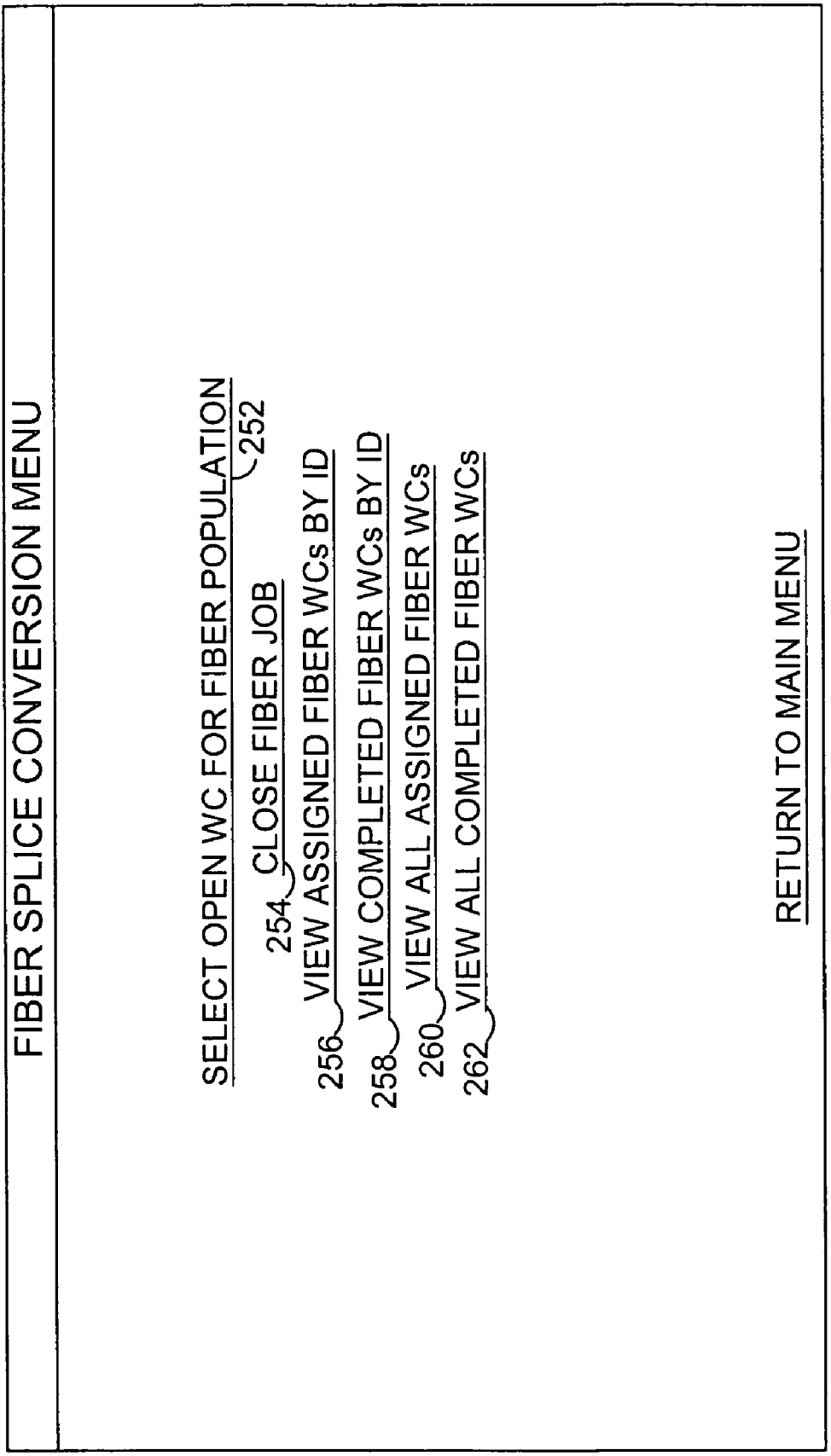
FIG. 2C is a sample screen shot of an embodiment, among others, of a fiber splice menu screen representation of the TRAKS application of FIG. 1B.
Figure 21:
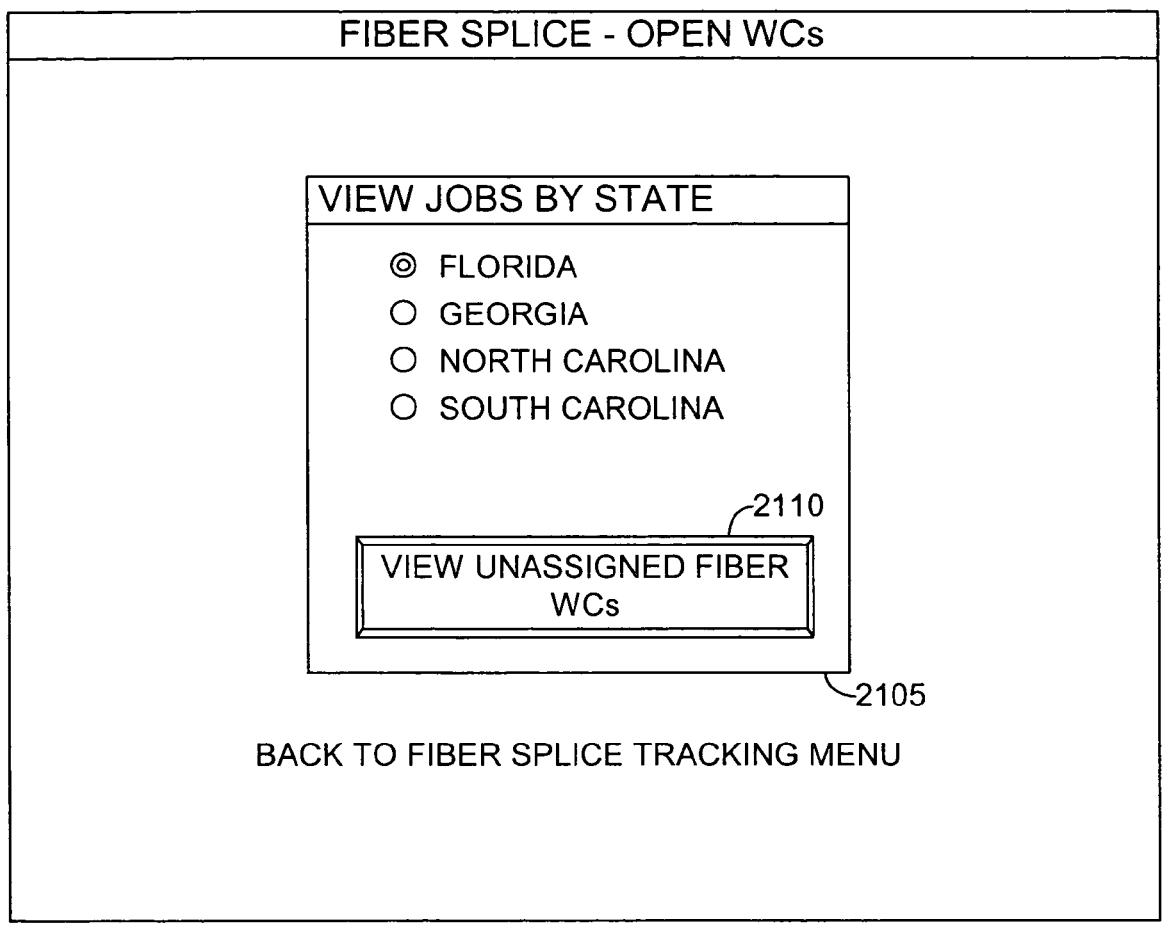
FIG. 21 is a sample screen shot of an embodiment, among others, of a fiber splice unassigned jobs screen representation of the TRAKS application of FIG. 1B.
Figure 25:
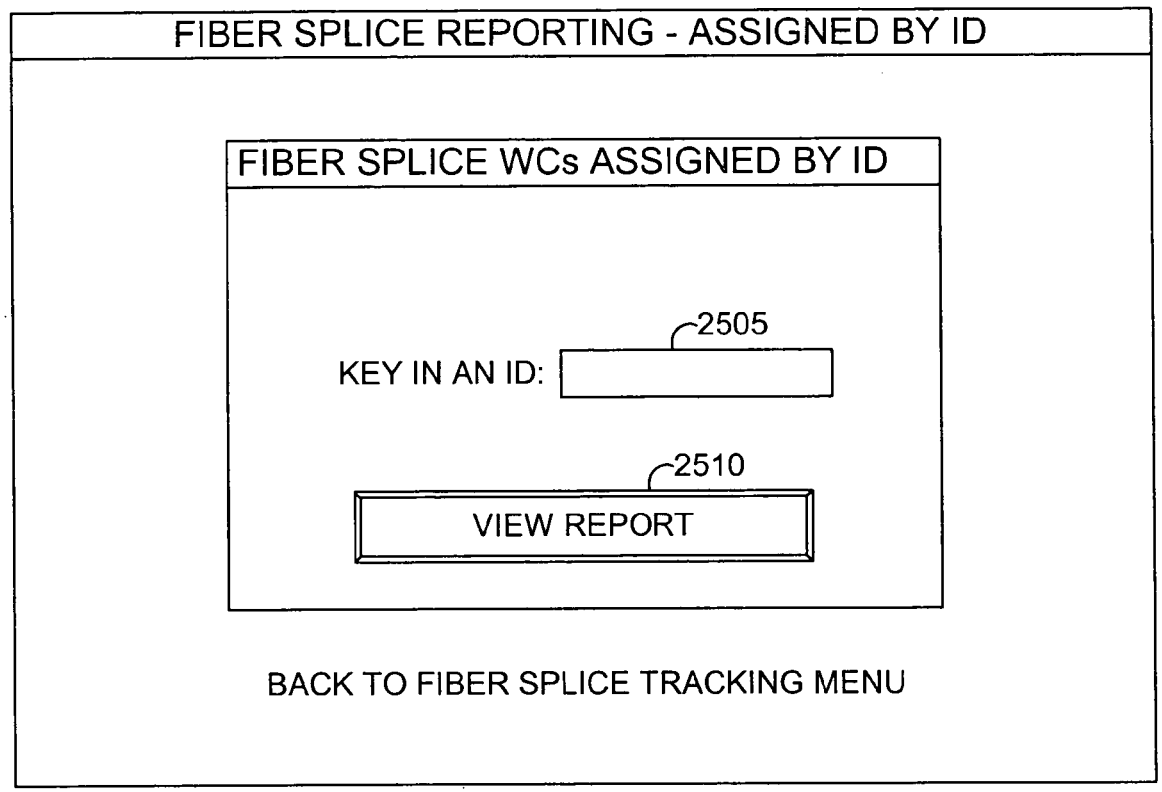
FIG. 25 is a sample screen shot of an embodiment, among others, of a fiber splice assignment by ID screen representation of the TRAKS application of FIG. 1B.
Figure 27:
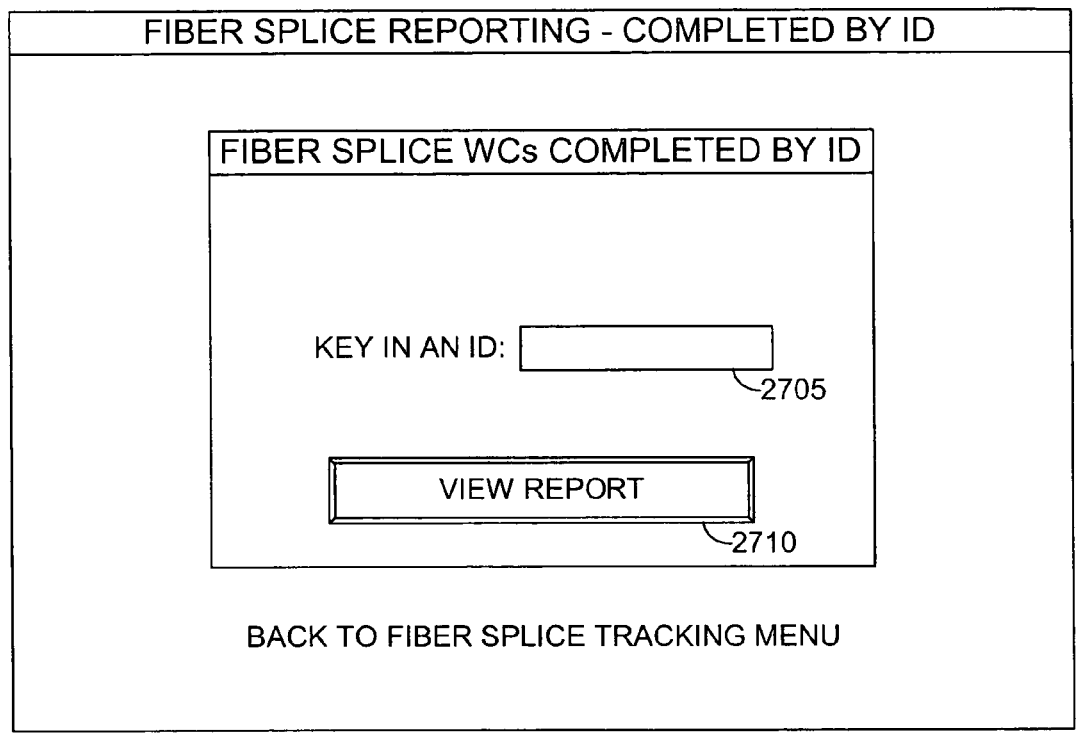
FIG. 27 is a sample screen shot of an embodiment, among others, of a fiber splice completed jobs reporting by ID opening screen representation of the TRAKS application of FIG. 1B.
Figure 30:
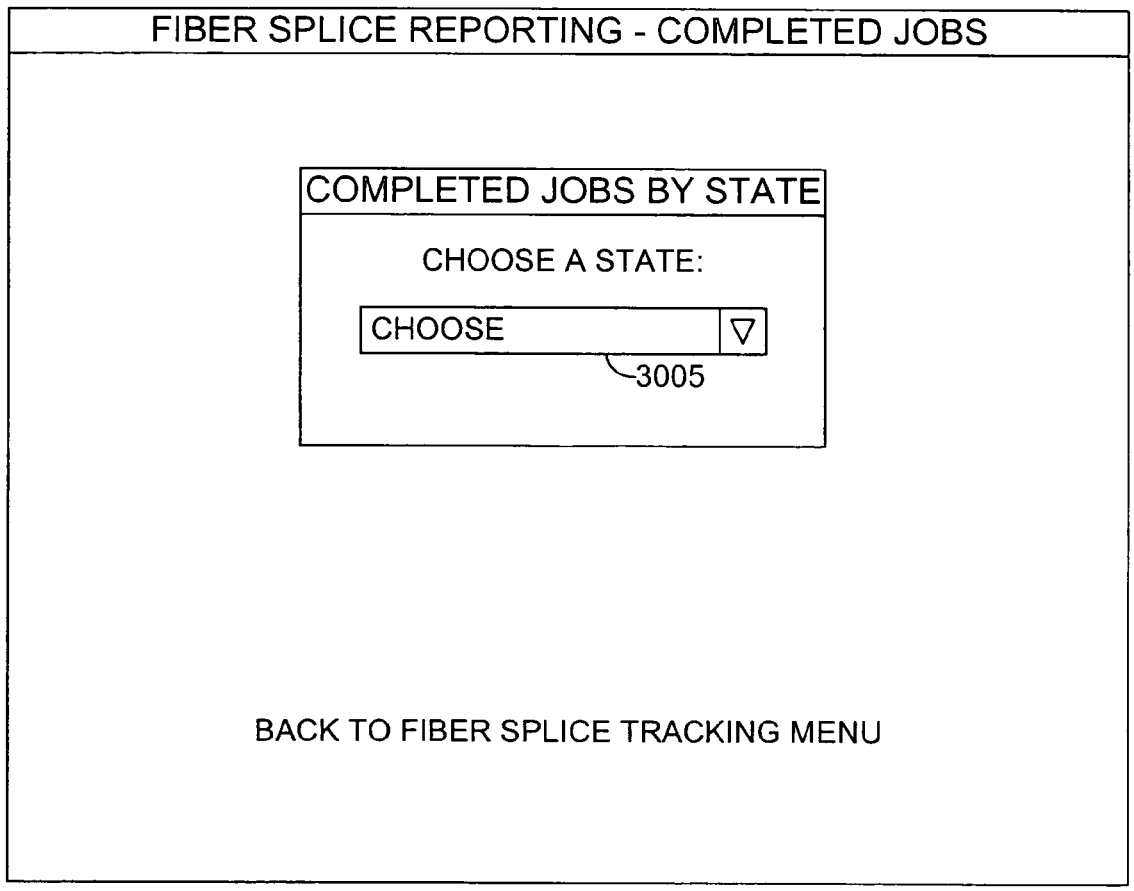
FIG. 30 is a sample screen shot of an embodiment, among others, of a fiber splice completed jobs reporting screen representation of the TRAKS application of FIG. 1B.

Referring now to FIG. 2C, shown is a screen shot of an embodiment, among others, of a fiber splice menu screen representation 240. A user would typically access this screen representation 240 by selecting the fiber splice link representation 204 of FIG. 2A. A "Select Open WC for Fiber Population" link representation 242 requests an open wirecenters screen representation as shown in FIG. 21. A "Close Fiber Job" link representation 244 requests a close fiber job screen representation as shown in FIG. 24. A "View Assigned WCs by ID" link representation 246 requests an assigned wirecenters by ID screen representation as shown in FIG. 25. A "View Completed WCs by ID" link representation 248 requests a completed wirecenters by ID screen representation as shown in FIG. 27. A "View All Assigned Fiber WCs" link representation 250 requests a view fiber wirecenters screen representation as shown in FIG. 29. A "View All Completed WCs" link representation 252 requests a completed jobs screen representation as shown in FIG. 30.

Occasionally a plat becomes too crowded such that a user such as an engineer or poster finds it difficult or inefficient to work with the plat. Because the RMC remains responsible for drawings, the RMC draftsmen are responsible for splitting the plats into manageable divisions, and performing drafting for the pre-posting and final post jobs. In those instances where a split plat is desired, the user requests a split plat (SPLAT) screen representation by selecting a split plat link representation in the TRAKS application 160, and submits a request to divide the single plat into multiple plats by using the split plat screen representation of FIG. 3. As shown with respect to FIG. 3, the split plat screen representation 300 typically prompts the user to enter location information about the plat. In one embodiment, among others, the location information typically includes the district name, the wirecenter name, and the name of the plat to be divided. As one skilled in the art should recognize, a wirecenter is typically associated with a central office. The wirecenter represents the area (homes, businesses, etc.) which the central office serves. These are typically provided by the user selecting a district from a district list representation 305 populated from a TRAKS database containing existing districts. Upon choosing a district a wirecenter list representation 310 populates, enabling the user to choose among the wirecenters available in the selected district. The user would then enter a plat name into the plat name field representation 315, and an identification into the "Your ID" field representation 320. Typically the identification includes a user ID issued to all employees. Upon entering an ID into the "Your ID" field representation 320, the user would typically select the "Submit Splat Request" button representation 325 to submit the split plat request. One skilled in the art should recognize that the plat assignment system, in some embodiments, among others, is configured such that only authorized users have access to enter split plat requests.

Figure 4:
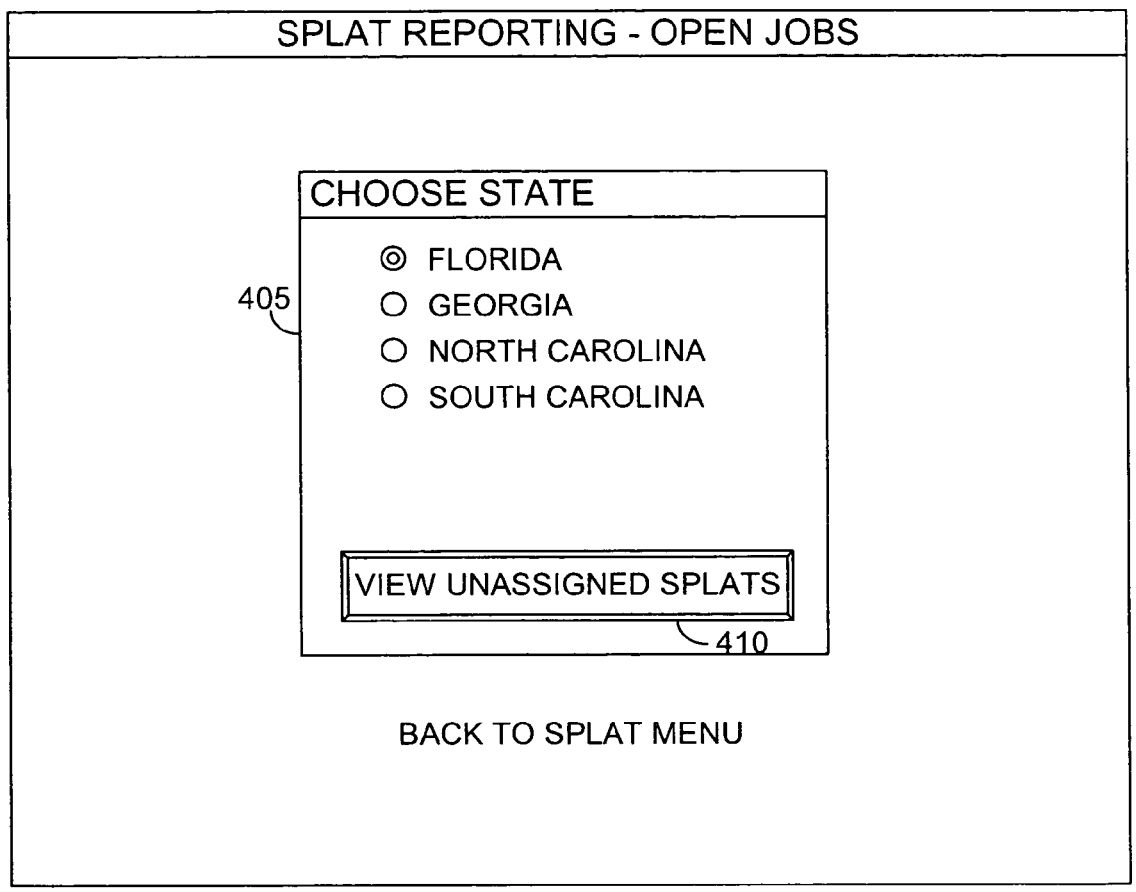
FIG. 4 is a sample screen shot of an embodiment, among others, of an opening split plat assignment page screen representation of the TRAKS application of FIG. 1B.

Referring now to FIG. 4, shown is a state selection screen representation 400 for the split plat workflow management. A supervisor typically uses this screen representation 400 to begin the assignment of a split plat job to a draftsman (poster). Typically the supervisor first selects the state in a split plat using a state selection representation 405. The user then selects the "View Unassigned SPLATs" button representation 410 to retrieve unassigned split plat jobs. The button representation 410 is typically selected by moving the mouse cursor representation over the button representation and pressing the left button of the mouse, however, the user could also use the keyboard, as is known in the art.

Referring now to FIG. 5, shown is a SPLAT job assignment screen representation 500. The supervisor would typically use the pulldown menu representation 505 to select any of the unassigned split plat jobs that exist in the state selected from the previous screen representation 400. Upon choosing an unassigned split plat, the supervisor typically enters a identification code associated with the draftsman (poster) to whom the supervisor desires to assign the split plat job. The identification code is typically entered into an "Assign To:" field representation 510. Upon completing the assignment screen field representations 505, 510, the supervisor selects the "Select" button representation 515 to record the assignment.

Referring now to FIG. 6, shown is a hardcopy front sheet screen representation 600 associated with the split plat assignment job. The supervisor typically receives this screen representation 600 after selecting the "Select" button representation 515 of the previous screen representation 500. The supervisor would typically print this screen representation 600 for the hardcopy of a file for the job request. A hardcopy file would then be created by a file clerk including the front sheet. Ultimately, the file is given to the draftsman responsible for completing the split plat job.

Figure 7:
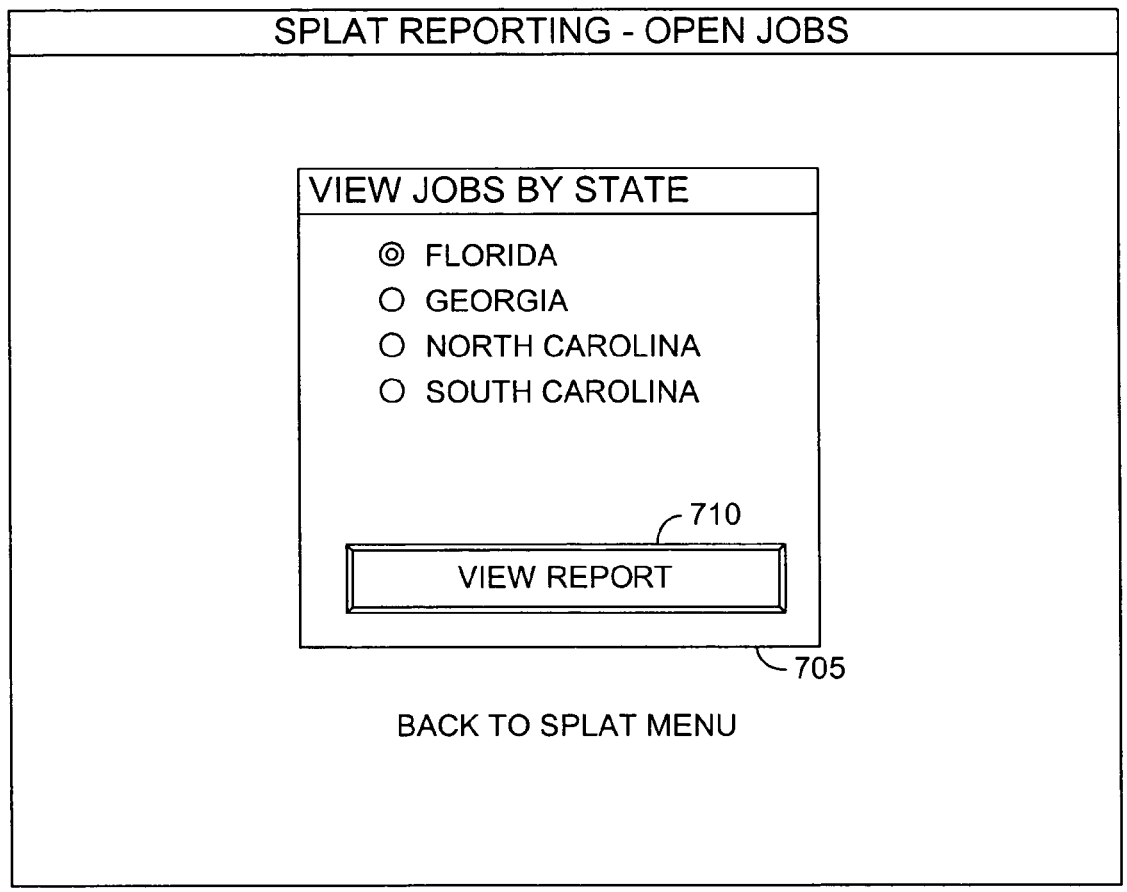
FIG. 7 is a sample screen shot of an embodiment, among others, of a split plat state selection reporting page screen representation of the TRAKS application of FIG. 1B.

Referring to FIG. 7, shown is a "View Open SPLAT Jobs" screen representation 700. A supervisor would typically use the state selection representation 705 to select a state in which to view open split plat jobs. Upon selecting the "View Report" button representation 710, TRAKS would retrieve the open split plat jobs from memory, and format the open split plat jobs for viewing by the supervisor.

Referring now to FIG. 8, shown is an open split plat jobs screen representation 800. The open jobs screen representation 800 typically includes a number of column representations 805-845. Typically, in one embodiment, among others, these columns include: a "Priority" column representation 805; a "Job Number" column representation 810; a "Wirecenter" column representation 815; an "NPA" column representation 820; an "NPX" column representation 825; a "Plat" column representation 830; an "Assigned" date column representation 835; an "Assigned To" column representation 840; and an "Age" column representation 845. The "Priority" column representation 805 typically tracks the priority level associated with the open split plat jobs. The "Job Number" column representation 810 typically represents the job number associated with a particular split plat job. The "Wirecenter" column representation 815 typically discloses the wirecenter in the plat which needs to be divided is located. The "NPA" and "NPX" column representations 820, 825, respectively, typically represent the area code (NPA) and the exchange code (NPX), which, taken together, are a unique identifier for a wirecenter. The "Plat" column representation 830 typically includes the name of the plat which is to be split. The "Assigned" date column representation 835 typically tracks the date on which the split plat job was assigned, if it has been assigned. The "Assigned To" column representation 840 typically tracks the drafter (poster) to which the split plat job was assigned, if it has been assigned. In the embodiment shown, among others, the drafter's initials are used to identify the responsible drafter. However, in alternative embodiments, among others, the drafter's identification code is used. The "Age" column representation 845 typically keeps track of the number of days that the split plat job request has been pending. It should be recognized by one skilled in the art that the column could be made sortable if the supervisor desired to have the ability to organize the list according to any of the column representations.

Similarly, TRAKS also allows a manager/supervisor to view jobs assigned to a draftsman according to their unique user ID. Referring now to FIG. 9, shown is a view assigned split plat jobs by identification screen representation 900. A supervisor would typically enter a user's unique identification into a "Key In An ID" field representation 905. Then the supervisor would select the "View Report" button representation 910. Upon selecting the "View Report" button representation 910, a request would be sent to TRAKS to retrieve all split plat jobs assigned to the unique identification number entered.

Referring now to FIG. 10, shown is an "Assigned Splat Jobs by ID" screen representation 1000. This screen representation 1000 is typically reached after selecting the "View Report" button representation 910 of the previous screen representation 900. The "Assigned Splat Jobs by ID" screen representation 1000 is typically arranged into several column representations 1005-1040. The columns are typically arranged similarly to the columns of FIG. 8. However the column representations of FIG. 10, typically also include a "Completed" column representation 1040, and the screen representation 1000 includes a "Total" field representation 1045. The "Completed" column representation typically tracks the date upon which the draftsman has indicated that he or she has completed the job. The "Total" field representation 1045 is typically the number of jobs that have been assigned to the unique identification number provided previously.

In an alternative embodiment, among others, TRAKS is responsible for managing the assignment of drawings that are being redrawn. In an embodiment, among others, of TRAKS the drawings are being converted from an old drawings format called Predator to the EWO intelligent database format which supports drawings which include optical fiber. As such the project is referred to as fiber conversion. Predator is a drawing format that cannot support new tools available for the EWO drawings. Predator is available from Colortrac Ltd./ACTion Imaging Solutions of Littleton, Colo. The workflow for this project can be seen with regard to FIGS. 11-20. The RMC, in an embodiment, among others, begins by printing out all of the wirecenter drawings that are stored in the old format.

Figure 11:
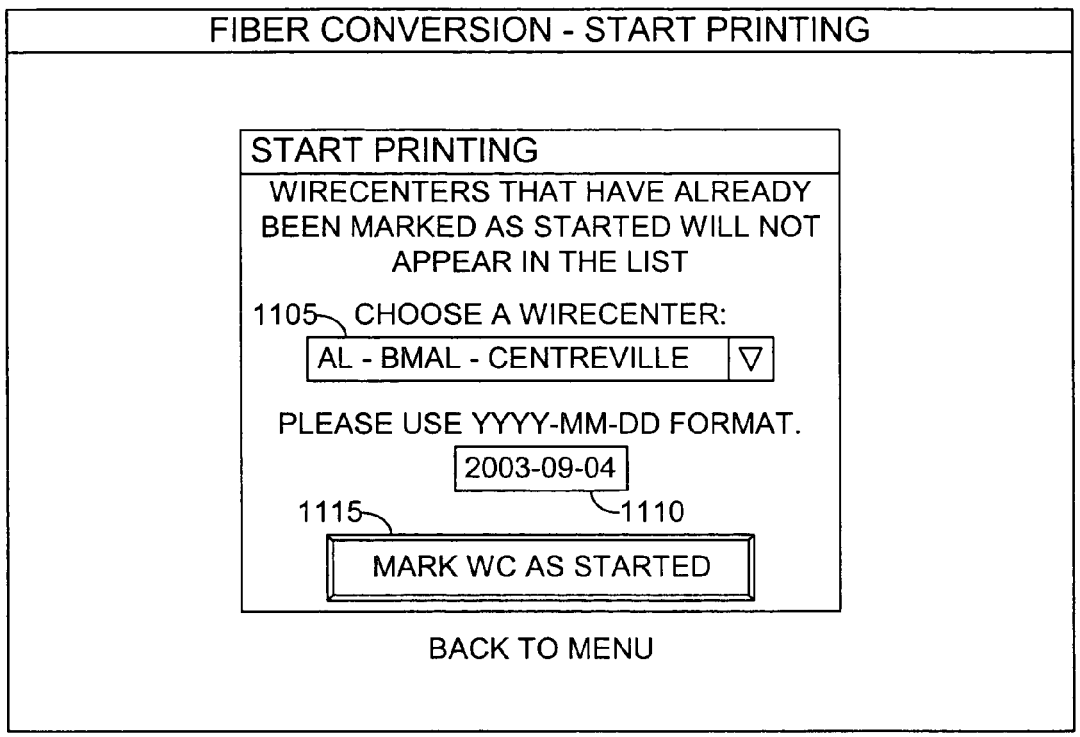
FIG. 11 is a sample screen shot of an embodiment, among others, of a fiber conversion start printing screen representation of the TRAKS application of FIG. 1B.

Referring now to FIG. 11, shown is a "Start Printing" screen representation 1100 which the employee uses to begin printing of a wirecenter. The employee typically chooses a wirecenter from a wirecenter pull-down menu representation 1105. The employee also enters a date as the begin print date in the date field representation 1110. The employee typically chooses the "Mark WC as Started" button representation 1115 upon completion of the previous items. The button representation 1115 does not typically start the printing, but marks the record as having been started. The printing is typically started by an employee responsible for printing the wirecenters. After the wirecenter has begun printing from the current Predator record, TRAKS marks the wirecenter as having begun being printed, such that other users will not reprint the wirecenter. After the wirecenter has been printed, the draftsman re-draws the plat using an EWO plat that has been created for each of the plats that comprise the wirecenter. Because the plats were previously in the Predator format, and an EWO version of the file does not exist, typically a regional land administration center (RLAC) is responsible for creating the EWO plats (files) for the draftsman.

Referring now to FIG. 12, shown is a "Wirecenter Printing Report" screen representation 1200. The "Wirecenter Printing Report" screen representation 1200 is typically operable to format data regarding the printing status of each of the wirecenters being converted and report the status to a manager. Typically the "Wirecenter Printing Report" screen representation is divided into a number of column representations 1205-1240. These column representations are typically self explanatory, and in one embodiment, among others, includes: a "State" column representation 1205; a "District" column representation 1210; a "WC" column representation 1215; a "CLLI_CODE" column representation 1220; an "Available" column representation 1225; a "Print Start" column representation 1230; a "QRTL" column representation 1235; and, a "Units" column representation 1240. The "State" column typically represents the state in which the wirecenter is located. The "District" column is a further breakdown of the location of the wirecenter. The "WC" column is a name associated with the wirecenter, and the "CLLI_CODE" column is a common language location identifier referring to the wirecenter. The "Available" column typically lists the dates that an RLAC makes land available. This is typically the date on which the RLAC has finished creating the file that corresponds to the piece of land that comprises the plat. The RLAC compiles information on plats from information provided by the outside plant engineers in the form of subdivision maps, builder plats, county maps, survey information, etc. The "Print Start" column typically represents the date that printing was started for the wirecenter. The "QRTL" typically represents the complexity of the conversion according to fiber units. The "Units" column typically represents the units of fiber that exist in the wirecenter according to financial data from corporate records. The manager is able to use the "Wirecenter Printing Report" to determine and report progress to his or her superiors. Moreover, each of the wirecenters are assigned a number of units (shown by the "Units" column representation 1240) which is operable to give the manager/supervisor a better understanding of the progress made on printing the wirecenters.

Referring now to FIG. 13, shown is a wirecenter availability screen representation 1300. The wirecenter availability screen representation 1300 typically shows the draftsmen, supervisor and/or manager which wirecenters are available for assignment. The availability of a wirecenter not only refers to the fact that the wirecenters have not been assigned to a draftsman, but also helps the manager keep track of which wirecenters the RLAC has made available to the draftsman. For example, there may be no wirecenters available for assignment on the wirecenter availability screen, however, the dearth of available wirecenters does not indicate that each of the wirecenters has been assigned for conversion. Rather, the lack of available wirecenters could indicate that the RLAC is not keeping up with the demand for available wirecenters, and allows the manager to know when the RLAC is not supplying the draftsman with work. The wirecenter availability screen representation 1300 in one embodiment, among others, typically includes: a "State" column representation 1305; a "District" column representation 1310; a "WC" column representation 1315; a "CLLI_CODE" column representation 1320; an "Available" column representation 1325; a "Print Start" column representation 1330; a "QRTL" column representation 1335; and, a "Units" column representation 1340. The "State" and "District" column representations 1305, 1310, respectively, typically represent the state and district in which the wirecenter is located. The "WC" column representation typically represents the wirecenter name. The "CLLI_CODE" column representation 1320 typically represents the CLLI code associate with the wirecenter. The "Available" column representation 1325 typically represents the date upon which the wirecenter was made available. The "Print Start" column representation 1330 typically represents the date upon which printing was started for the wirecenter. The "QRTL" column representation 1335 typically represents the quartile to which the wirecenter has been assigned. The "Units" column representation 1340 typically represents the number of fiber units that need to be converted within the wirecenter. The screen representation 1300 also typically includes a total field representation 1345 which represents a total of the number of available wirecenters reported.

Referring now to FIG. 14, shown is a wirecenter assignment screen representation 1400. The wirecenter assignment screen representation 1400 is operable to instruct TRAKS to assign a wirecenter to a draftsman. Typically the wirecenter assignment screen representation 1400 allows the user to assign the wirecenter to himself or herself, however, one skilled in the art should recognize that a supervisor/group leader could be placed in charge to assign wirecenters to draftsmen, not including himself or herself. The wirecenter assignment screen representation typically includes a "Choose a Wirecenter" pull-down menu representation 1405. The pull-down menu representation 1405 enables a user to choose a wirecenter to assign to himself or herself. Upon selecting a wirecenter, the user can select the "Assign WC to Yourself" button representation 1410. TRAKS will then receive the request and assign the wirecenter to the user logged in to the particular station from which the request was received.

Referring now to FIG. 15, shown is a wirecenter closing screen representation 1500. A draftsman would typically use this screen representation to close any wirecenters that he or she has assigned to himself or herself. The draftsman would typically close a wirecenter after having entered all of the existing drawings into the EWO system, making changes to the plats received from RLAC. After selecting the wirecenter using the wirecenter field representation 1505, and selecting the "Mark WC Complete" button representation 1510, TRAKS will change the status of the wirecenter to "Complete".

Referring now to FIG. 16, shown is an assigned wirecenter screen representation 1600. The assigned wirecenter screen representation 1600 is operable to display the wirecenters that have been assigned to the user viewing the screen. Thus, if the user has only assigned himself or herself one wirecenter, only one wirecenter will appear on his or her assigned wirecenter screen representation 1600. The assigned wirecenter screen representation 1600 in one embodiment, among others typically includes: a "State" column representation 1605; a "District" column representation 1610; a "WC" column representation 1615; a "CLLI_CODE" column representation 1620; an "Available" column representation 1625; a "Print Start" column representation 1630; an "Assigned" column representation 1635; an "Assigned To" column representation 1640; and, a "Units" column representation 1645. The screen representation 1600 also typically includes a "Total" field representation 1650, which displays the number of records stored with regard to wirecenters assigned to a user identification.

Similarly, with reference to FIG. 17, shown is an assignment status screen representation 1700. The assignment status screen representation 1700 is typically used by a supervisor or manager to determine which wirecenters have been assigned, and which of the draftsmen have assigned himself or herself to a particular wirecenter. Moreover, the assignment status screen representation 1700 also denotes the state and district of the wirecenter, the common language location identifier (CLLI) code associate with the wirecenter, the date the wirecenter was made available, the date that printing was started on the wirecenter, the date the wirecenter was assigned and the units of fiber that are contained within the wirecenter. Each of these fields are typically displayed to the user under a number of column representations 1705-1745. Moreover, the screen representation 1700 also typically includes a "Total" field representation 1750 which displays the total number of wirecenters that have been assigned.

Referring now to FIG. 18, shown is a completed wirecenter screen representation 1800. A manager would typically use the completed wirecenter screen representation 1800 to view the wirecenters that have been completed to date. Each of the completed wirecenters, as closed by the draftsman using the close wirecenter screen representation 1500 of FIG. 15, would appear in the listing. The screen representation 1800 typically includes a number of column representations 1805-1845. These column representations 1805-1845 in one embodiment, among others, include: a "State" column representation 1805; a "District" column representation 1810; a "WC" column representation 1815; a "CLLI_CODE" column representation 1820; an "Assigned" column representation 1825; an "Assigned To" column representation 1830; a "Completed" column representation 1835; an "Hours" column representation 1840; and, a "Units" column representation 1845. The screen representation 1800 also typically includes a "Total" field representation 1850, which displays the number of records stored with regard to the completed wirecenters.

Referring now to FIG. 19, shown is an "Accepted Wirecenters" screen representation 1900. The accepted wirecenters are typically those wirecenters that have been completed, and then accepted by the manager. Typically, however, the manager has a specified period of time in which to accept the wirecenter as complete. At the end of this specified period of time, TRAKS will automatically accept a wirecenter. The automatic wirecenters can be marked as automatically accepted, and in one embodiment, among others, are color-coded to indicate automatic acceptance. The screen representation 1900 typically displays the data to the user in column form, which in one embodiment, among others, typically includes: a "QRTL" column representation 1905; a "State" column representation 1910; a "District" column representation 1915; a "WC" column representation 1920; a "CLLI_CODE" column representation 1925; an "Accepted" column representation 1930; and, an "Accepted By" column representation 1935. Each of column representations 1905-

1925 have been previously described. The "Accepted" column representation 1930 typically represents the date on which the wirecenter was accepted by a supervisor (or automatically accepted). The "Accepted By" column representation 1935 typically represents the supervisor who accepted the wirecenter ("AUTO" indicates that the wirecenter was automatically accepted). The screen representation 1900 also typically includes a "Total" field representation 1940, which displays the number of records stored with regard to the accepted wirecenters.

Referring now to FIG. 20, shown is a "Drawing Conversion Summary" screen representation 2000. The "Drawing Conversion Summary" screen representation 200 is typically used by management to track the progress of the drawing conversions. These summaries can be used to project a completion date, a slippage of schedule, availability of wirecenters, etc. Summaries such as this are a particularly useful tool in determining productivity, bonuses, efficiency, etc., especially in an environment where much of the work is performed through contract employees that report to another entity.

Another job workflow that TRAKS is responsible for is a fiber conversion project which converts existing manhole and conduit representations in the EWO database to "Route Manhole" and "Route Conduit" features. Further, two cross-wirecenter splices are being added for each location in which a fiber cable crosses a wirecenter boundary into another wirecenter. These features typically create a logical connection in the EWO database, whereas previously the manhole and conduit representations were recognized as an "open" in the circuit. The cross-wirecenter splices similarly create a logical connection between wirecenter drawings.

Referring now to FIG. 21, shown is a representation of an opening screen representation 2100 to view available wirecenters for assignment (e.g., those which have not been updated or assigned). Typically, the user selects a state which he or she would like to view the available wirecenters from the state selection representation 2105. Upon selecting the state, the user typically selects the "View Unassigned Fiber WCs" button representation 2110. The "View Unassigned Fiber WCs" button representation typically requests a wirecenter assignment screen representation, as shown in FIG. 22, from TRAKS.

Referring now to FIG. 22, the user typically uses the wirecenter assignment screen representation 2200 select a wirecenter on which he or she would like to work. To do so, the user would typically use a pulldown menu representation 2205 to select the wirecenter. The user would then enter his or her identification code (or a supervisor would enter an identification code for a draftsman) into the ID field representation 2210, and select the "Select" button representation 2215 to assign the wirecenter to him or herself.

Figure 23:
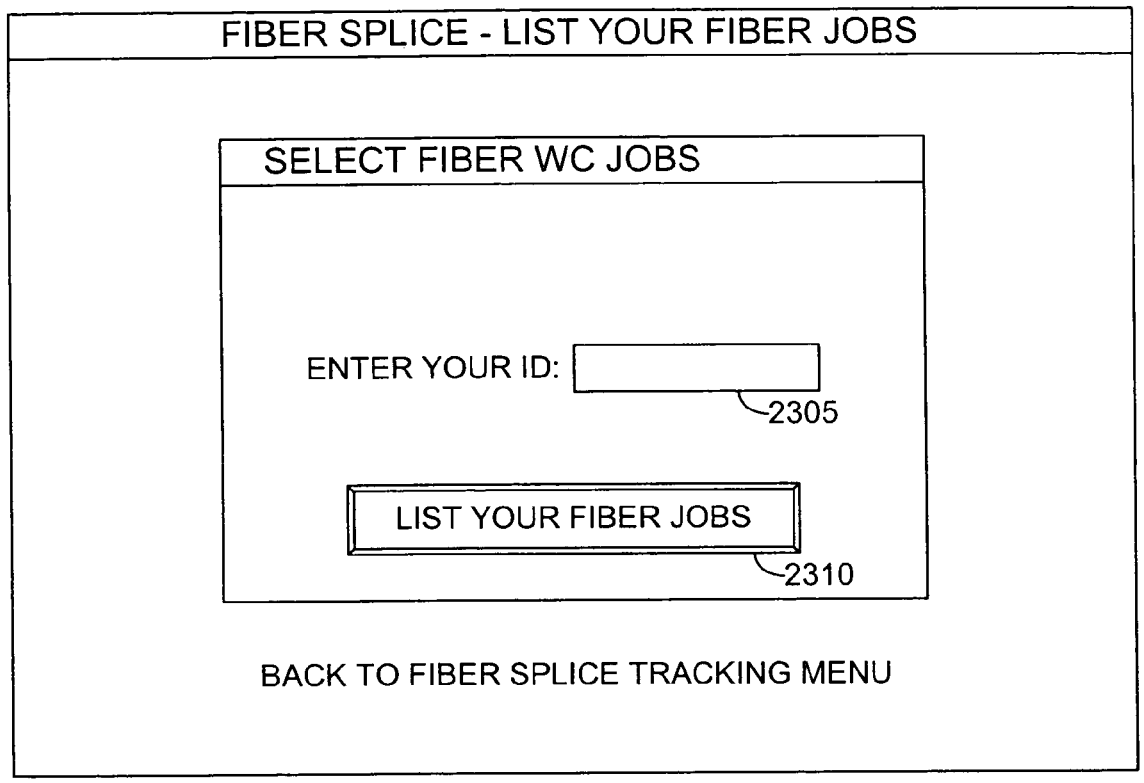
FIG. 23 is a sample screen shot of an embodiment, among others, of a fiber splice completion opening screen representation of the TRAKS application of FIG. 1B.

Referring now to FIG. 23, shown is an embodiment, among others, of a "Close Fiber Job" screen representation 2300. The draftsman typically uses this screen to close a job after the job has been completed. As explained above, completion typically involves changing each existing conduit and manhole to a "route conduit" and "route manhole", respectively. Moreover, each location in which a fiber crosses a wirecenter, a cross-wirecenter splice is inserted. Upon completing a job the draftsman could choose a "Mark Wirecenter Complete" option from a main menu representation and receive the "Close Fiber Job" screen representation 2300 of FIG. 23. The draftsman would typically enter his or her user identification into an "ID" field representation 2305. The draftsman could then typically select the "List Your Fiber Jobs" button representation 2310 to request a list of jobs associated with his or her user identification.

Referring now to FIG. 24, shown is an embodiment, among others, of a "Select a Wirecenter to Complete" screen representation 2400. The "Select a Wirecenter to Complete" screen representation 2400 is typically reached after entering a user identification and selecting the button representation of FIG. 23. The "Select a Wirecenter to Complete" screen representation 2400 typically includes a pull-down menu representation 2405 including each of the wirecenters that are currently assigned to the user identification that was previously entered. Thus, the draftsman would typically scroll through the wirecenters that were assigned to his or her user identification and highlight a job that the draftsman desired to mark as complete. Upon highlighting a job, the draftsman can select the "Mark WC as Complete" button representation 2410. This button will send a request to TRAKS to mark the selected wirecenter as complete.

Referring now to FIG. 25, shown is an embodiment, among others, of a job reporting by user ID screen representation 2500. A manager or draftsman would typically use this screen to determine how many fiber splice jobs have been assigned to a user ID. In the screen representation 2500, a manager or draftsman typically enters a user identification (typically the user's own user ID if the user is a draftsman). Upon entering a user identification into the field representation 2505, the user would select the "View Report" button representation 2510 to view each of the jobs assigned to the user ID entered.

Referring now to FIG. 26, shown is an embodiment, among others, of a report screen representation 2600. A user would typically receive the screen representation 2600 after entering a user ID and selecting the "View Report" button representation 2510 of FIG. 25. The report screen representation typically includes a list of jobs assigned to the ID that was entered in the previous screen representation 2500. The list typically includes column representations 2605-2620 for each field related to a job. The column representations 2605-2620 in one embodiment, among others, include: the wirecenter; the NPA, which, as outlined above, describes an area code; the NPX, which, as outlined above describes an exchange code; and, an assignment date. The screen representation 2600 also typically includes a "Total" field representation 2625, which displays the number of records displayed with regard to the assigned jobs.

Referring now to FIG. 27, shown is a completed fiber splice job reporting by ID screen representation 2700. Typically, this screen representation 2700 enables a manager or draftsman to submit a user identification in order to view completed jobs assigned to that user identification. In particular, the user typically enters a user identification into the ID field representation 2705. Upon entering a user identification into the ID field representation 2705, the user typically selects a "View Report" button representation 2710 to view the completed jobs associated with the user identification entered. Upon selecting the "View Report" button representation, a request is sent to TRAKS to retrieve completed jobs associated with the user identification entered by the user.

Referring now to FIG. 28, shown is an embodiment, among others, of a "Jobs Completed by ID" screen representation 2800. The "Jobs Completed by ID" screen representation 2800 is typically sent to a user in response to a request submitted from screen representation 2700. The "Jobs Completed by ID" screen representation typically includes a number of column representations 2805-2820. The column representations typically describe the content of the column representation. In an embodiment, the column representations include, among others: a "Wirecenter" column representation 2805; an "NPA" column representation 2810; an "NPX" column representation 2815; and, a "Completed" column representation 2820. The screen representation 2800 further includes a "Total" field representation 2825 representing the total number of items that are listed in the report. The screen representation 2800 also typically includes a "Back to Fiber Splice Tracking Menu" link representation 2830, which, when selected requests the fiber splice tracking menu screen representation from TRAKS. The screen representation 2800 also typically includes a "Total" field representation 2835, which displays the number of records displayed with regard to the jobs completed by the entered user identification.

Referring now to FIG. 29, shown is an embodiment, among others, of a "Jobs Assigned to RMC East" screen representation 2900. A user typically requests this page from TRAKS by selecting to view all assigned wirecenters from the fiber splice tracking menu screen representation. The screen representation 2900 typically includes a chart representation having a number of column representations 2905-2925. In an embodiment, among others, the column representations include: a "Wirecenter" column representation 2905; an "NPA" column representation 2910; an "NPX" column representation 2915; an "Assigned" column representation 2920; and, a "Name" column representation. The "Wirecenter" column representation 2905 typically refers to the wirecenter associated with the entry. The "NPA" and "NPX" are described above. The "Assigned" column representation 2920 typically refers to the date on which the job was assigned. The "Name" column representation typically refers to the person to whom the job was assigned.

Referring now to FIG. 30, shown is an embodiment, among others, of a "Fiber Splice Reporting—Completed Jobs" screen representation 3000. The screen representation 3000 is typically used to determine the number of completed jobs by state. The user would typically choose a state from the pull-down menu representation 3005 using the mouse cursor. Upon selecting a state, a request would be sent to TRAKS to pull the completed jobs in the selected state from a database, and provide the completed jobs to the user.

Referring now to FIG. 31, shown is an embodiment, among others, of a completed jobs report screen representation 3100. The completed jobs report screen representation 3100 is typically sent to the user from TRAKS in response to the user requesting the completed jobs reporting page using the previous page representation 3000 by selecting a state. In particular, the completed jobs reporting screen representation 3100 includes a number of column representations 3105-3135. The column representations in an embodiment, among others, typically include: a "Wirecenter" column representation 3105; an "NPA" column representation 3110; an "NPX" column representation 3115; a "Completed" column representation 3120; a "Name" column representation 3125; an "Hours" column representation 3130; and, a "Prints" column representation 3135. The "Wirecenter," "NPA," "NPX," "Completed," and "Name" column representations 3105-3125 have been previously described. The "Hours" column representation 3130 typically relates the number of hours that have been logged on the job by the assignee. The "Prints" column representation 3135 typically relates the number of pages ("prints") the job entails. As one skilled in the art should recognize, the "Hours" column representation typically allows for a quarter of an hour for each page. However, it should also be recognized that other values could be provided.

Figure 32:
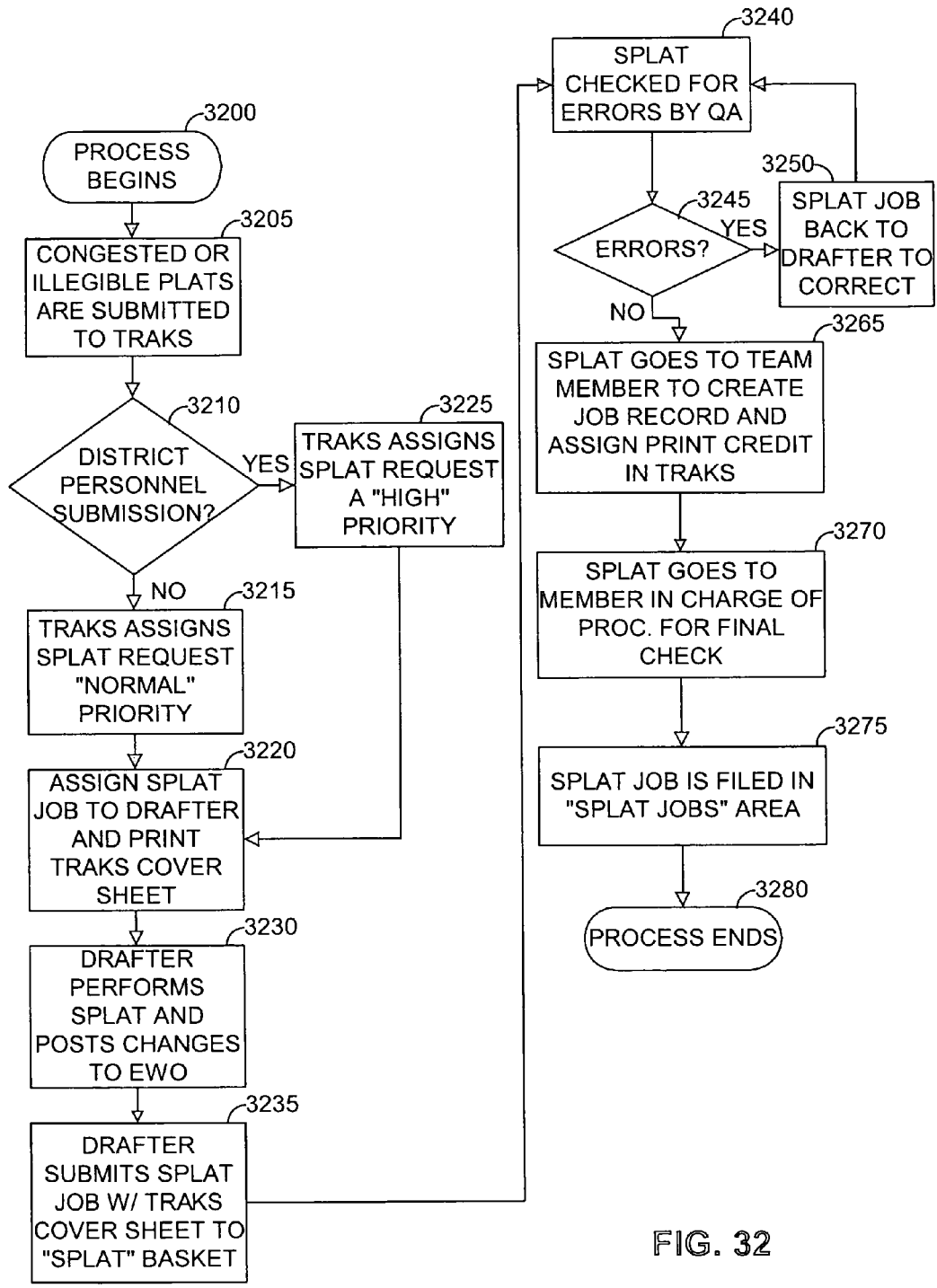
FIG. 32 is a flowchart illustrating the operation of an embodiment, among others, of the split plat management system of the TRAKS application of FIG. 1B.

Referring now to FIG. 32, shown is a flowchart of an embodiment, among others, of a split plat workflow associated with the TRAKS application 160. The process begins at step 3200. Typically TRAKS first receives a submission from a user regarding a congested or illegible plat, as shown in step 3205. In an embodiment, among others, of the TRAKS application 160, TRAKS determines whether the submission was made by an engineer or other district personnel, as shown in step 3210. If the submission was not made by an engineer or other district personnel, TRAKS assigns a "Normal" priority to the split plat request in step 3215. A supervisor then uses TRAKS to assign a split plat job to a draftsman and to print a cover sheet, as shown in step 3220. Alternatively, if the submission was made by an engineer or other district personnel, TRAKS assigns a "High" priority to the split plat request in step 3225. A supervisor or manager then assigns the job to a draftsman in step 3220.

In step 3230, the draftsman who is assigned to complete the split plat job performs the split plat, and posts the changes to the EWO system. In step 3235, after the drafter completes the split plat job, the drafter submits the split plat job with the TRAKS cover sheet to a "SPLAT basket." The jobs in the splat basket are then typically checked by quality assurance personnel for errors in step 3240. TRAKS determines whether errors exist in step 3245, and if errors do exist, the split plat job is returned to the drafter for correction in step 3250. If there are no errors in the job, the split plat job is sent to a team member to create a job record and to assign print credit in TRAKS for the drafter in step 3265. In step 3270, the split plat job goes to a supervisor for final check. The split plat job is then filed in a "Splat Jobs" area in step 3275, and the process ends in step 3280.

Figure 33A:
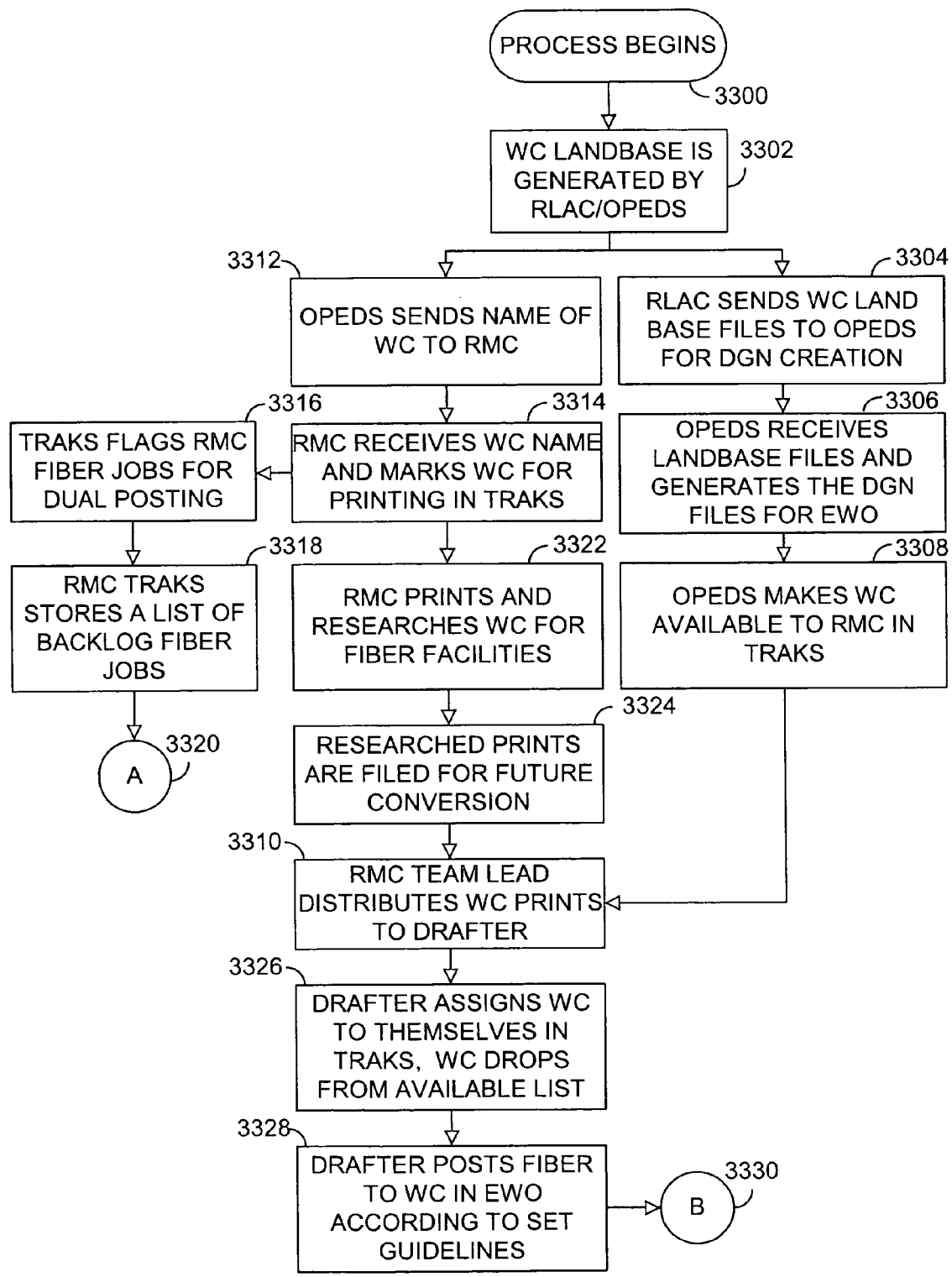
FIG. 33A is a flowchart illustrating the operation of an embodiment, among others, of the drawing conversion management system of the TRAKS application of FIG. 1B.
Figure 33B:
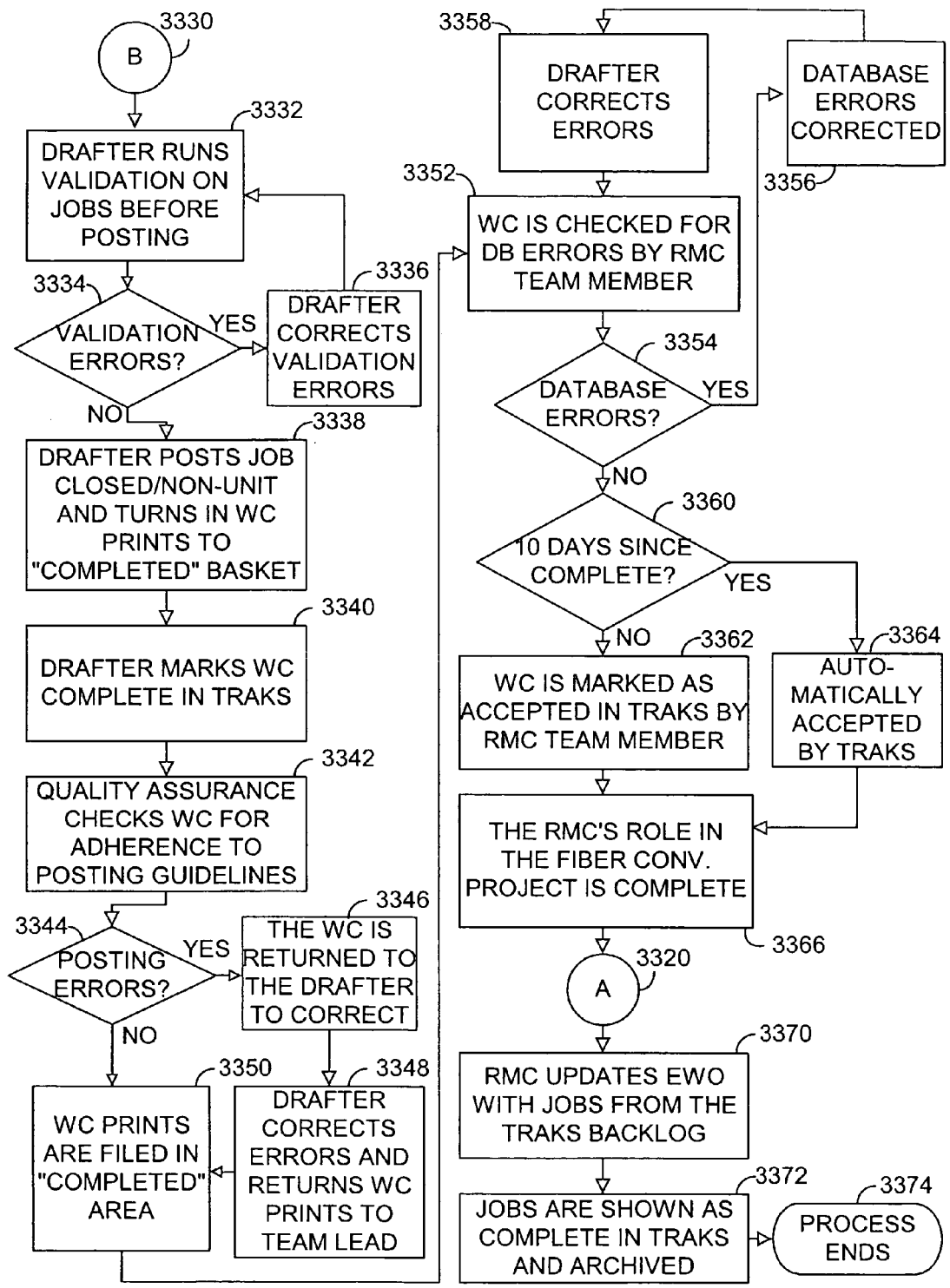
FIG. 33B is a continuation of the flowchart of FIG. 33A illustrating the operation of an embodiment, among others, of the drawing conversion management system of the TRAKS application of FIG. 1B.

Referring now to FIG. 33A, shown is a flowchart of an embodiment, among others, of the fiber conversion portion of the TRAKS application 160. The process begins in step 3300. In step 3302, the wirecenter land base is generated by RLAC/outside plant engineering design system (OPEDS). Then two processes typically occur in parallel. In the first process, the RLAC sends the wirecenter landbase to OPEDS for drawing (DGN) file creation in step 3304. OPEDS receives the landbase from RLAC, and generates the drawing files for EWO in step 3306. In step 3308 OPEDS makes the wirecenter available to the RMC in TRAKS. In step 3310, the RMC group lead distributes the wirecenter prints to a drafter. Returning to the second parallel process, in step 3312, OPEDS sends the name of the wirecenter to the RMC. In step 3314, the RMC receives the name of the wirecenter from OPEDS and marks the wirecenter for printing in TRAKS. In step 3316, TRAKS flags RMC fiber jobs for dual posting, since these jobs need fiber conversion in addition to conversion. TRAKS then stores a list of backlog fiber jobs in step 3318. One skilled in the art should recognize that the process continues at 3320 in FIG. 33B. Typically in parallel to step 3316, the RMC prints the land and researches the wirecenter for fiber facilities in step 3322. In step 3324, the researched prints are filed for future conversion. In step 3310 the first and second process converge and the RMC team lead distributes the prints to a drafter. The drafter then typically assigns the wirecenter prints received from the team lead to himself or herself using TRAKS in step 3326, and TRAKS drops the wirecenter from the available list. The drafter then typically posts fiber to wirecenter in EWO according to the RMC guidelines. The process then continues at 3330 in FIG. 33B. The drafter runs a validation on the jobs before posting in step 3332. If there are validation errors in step 3334, the drafter corrects the validation errors in step 3336, and runs another validation in step 3332. The drafter then posts the job as closed in step 3338, and turns in the wirecenter prints to a "Completed" basket. The drafter marks the wirecenter complete in TRAKS in step 3340.

Quality assurance then picks the completed job up from the "Completed" basket and checks wirecenter for adherence to the posting guidelines in step 3342. If there are posting errors in step 3344, the wirecenter is returned to the drafter to correct the errors in step 3346. In step 3348, the drafter corrects any posting errors and returns the job to the team lead. In step 3350, the wirecenter prints are filed in a "Completed" area. Similarly, if there are no posting errors found, the wirecenter prints are filed in the "Completed" area in step 3350.

In step 3352, the wirecenter is checked for database errors by an RMC team member. If there are database errors in step 3354, the wirecenter is returned to the draftsman for correction in step 3356. In step 3358, the draftsman corrects the database errors and returns the wirecenter to the team member for re-check. If there are no database errors, the RMC typically tries to accept or reject the wirecenter within ten days of the job being marked complete, as shown in step 3360. If ten days have not expired, in step 3362, the wirecenter is marked as accepted by an RMC team member. However, if ten days have expired, TRAKS automatically marks the wirecenter as accepted in step 3364. The RMC's role in the drawing conversion is then complete as shown in step 3366. Returning to marker 3320, if a conversion has been flagged for dual posting in step 3316, the RMC updates EWO with jobs from the TRAKS backlog in step 3370. The jobs are then shown as complete in TRAKS and archived in step 3372, and the process ends as shown in step 3374.

Figure 34:
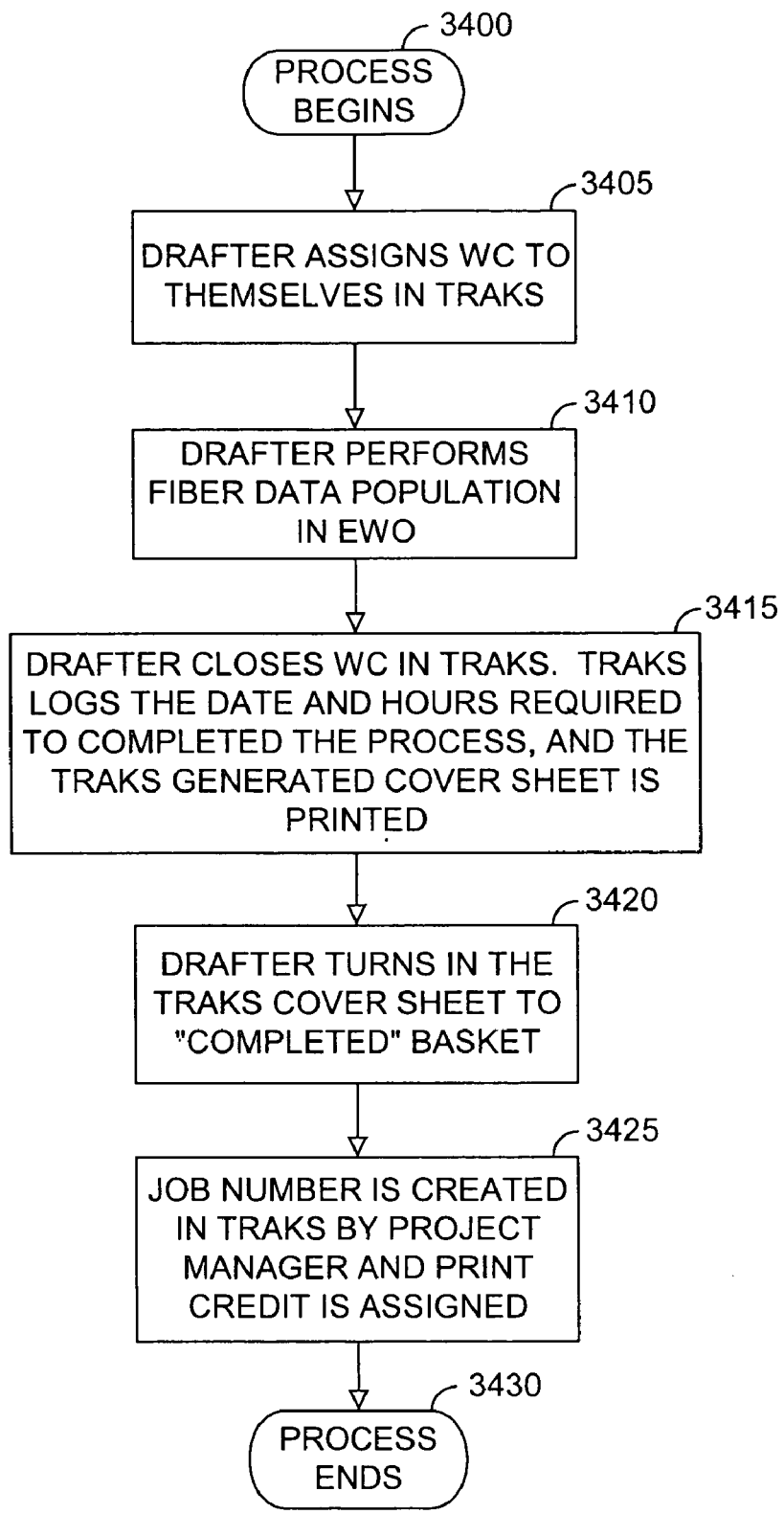
FIG. 34 is a flowchart illustrating the operation of an embodiment, among others, of the fiber splice management system of the TRAKS application of FIG. 1B.

Referring now to FIG. 34, shown is a flowchart of an embodiment, among others, of a fiber splice/conversion workflow associated with the TRAKS application 160. The process begins at step 3400. Typically the drafter first assigns a wirecenter to himself or herself using the TRAKS application, as shown in step 3405. After assigning a wirecenter to himself or herself, the drafter typically performs a fiber data population in EWO in accordance with step 3410. After performing the fiber data population in EWO, the drafter closes the wirecenter in TRAKS, and TRAKS logs the date and hours required to complete the job and prints the TRAKS cover sheet in step 3415. The draftsman then turns in the TRAKS cover sheet to the "Completed" basket in step 3420. A job number is then created in TRAKS for the job by the project manager and print credit is assigned to the draftsman in step 3425. The process ends at step 3430.

Process and function descriptions and blocks in flow charts can be understood as representing, in some embodiments, modules, segments, or portions of code which include one or more executable instructions for implementing specific logical functions or steps in the process, and alternate implementations are included within the scope of the preferred embodiment of the present disclosure in which functions may be executed out of order from that shown or discussed, including substantially concurrently or in reverse order, depending on the functionality involved, as would be understood by those reasonably skilled in the art of the present disclosure. In addition, such functional elements can be implemented as logic embodied in hardware, software, firmware, or a combination thereof, among others. In some embodiments involving software implementations, such software comprises an ordered listing of executable instructions for implementing logical functions and can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a computer-readable medium can be any means that can contain, store, communicate, propagate, or transport the software for use by or in connection with the instruction execution system, apparatus, or device.

It should also be emphasized that the above-described embodiments of the present disclosure are merely possible examples of implementations set forth for a clear understanding of the principles of the disclosure. Many variations and modifications may be made to the above-described embodiment(s) of the disclosure without departing substantially from the principles of the disclosure. All such modifications and variations are intended to be included herein within the scope of this disclosure and the present disclosure and protected by the following claims.

What is claimed is:

1. A drawing conversion management and assignment system, comprising:
    receiving logic of a computer system operable to receive notification of completion of a land base drawing file that is associated with a plat corresponding to a parcel of land represented by the land base drawing file;
    a database coupled to the receiving logic, operable to create a drawing conversion job record associated with the completed land base drawing file, the drawing conversion job record indicating that the plat corresponding to the completed land base drawing file is tasked to be converted into a new drawing format;
    assignment logic of the computer system coupled to the database and operable to assign the drawing conversion job record to a draftsman and to instruct the database to record the assignment, the drawing conversion job involving creation of a new drawing file based on at least information depicted in the land base drawing file and a prior plat of the parcel of land represented by the land base drawing file; and
    completion logic of the computer system coupled to the database and operable to receive a request to close the drawing conversion job record from the draftsman, and to instruct the database to mark the drawing conversion job record as closed to indicate that the plat has been redrawn in the new drawing format.

2. The system of claim 1, wherein the database is operable to store a plurality of drawing conversion job records.

3. The system of claim 2, further comprising:
    reporting logic coupled to the database, operable to enable any of a plurality of users to view the drawing conversion job record.

4. The system of claim 3, wherein the reporting logic is further operable to provide a summary report of a plurality of available drawing conversion job records, assigned drawing conversion job records, and complete drawing conversion job records.

5. The system of claim 3, wherein the reporting logic is further operable to enable any of a plurality of users to view a plurality of assigned drawing conversion job records.

6. The system of claim 3, wherein the reporting logic is further operable to enable any of a plurality of users to view a plurality of completed drawing conversion job records.

7. The system of claim 1, wherein the land base drawing file is provided by a regional land administration center.

8. The system of claim 7, wherein the land base drawing file is in an engineering work order format.

9. The system of claim 1, wherein the drawing conversion job record includes an availability date, wirecenter location information, a completed date, a quartile assignment, and a fiber units allocation.

10. A method for assigning and managing drawing conversions, comprising:
- receiving notification that a land base drawing file is available, the land base drawing file being associated with a wirecenter and being a basis for redrawing a plat corresponding to the wirecenter and the land base drawing file into a new drawing format;
- creating a drawing conversion job record associated with the available land base drawing file, the drawing conversion job involving creation of a new drawing file based on at least information depicted in the land base drawing file and a prior plat of the wirecenter represented by the land base drawing file;
- storing the drawing conversion job record in a database;
- assigning the drawing conversion job record to a draftsman;
- recording the assignment of the drawing conversion job record in the database; and
- closing the job upon receipt of a close request from the draftsman to indicate that the plat has been redrawn in the new drawing format, by marking the drawing conversion job record as closed in the database.

11. The method of claim 10, further comprising storing a plurality of drawing conversion job records in the database.

12. The method of claim 11, further comprising providing a report comprising details for at least the plurality of drawing conversion job records in the database.

13. The method of claim 11, further comprising providing a summary report of a plurality of available drawing conversion job records, assigned drawing conversion job records, and complete drawing conversion job records.

14. The method of claim 11, further comprising providing a plurality of unassigned drawing conversion job records to a plurality of users.

15. The method of claim 11, further comprising providing a plurality of completed drawing conversion job records to a plurality of users.

16. The method of claim 10, wherein the land base drawing file and notification are provided by a regional land administration center.

17. The method of claim 16, wherein the land base drawing file is in an engineering work order format.

18. The method of claim 10, wherein the drawing conversion job record includes an availability date, wirecenter location information, a completed date, a quartile assignment, and a fiber units allocation.

19. A non-transitory computer readable medium being a tangible medium and having a program for assigning and managing drawing conversions, the medium comprising instructions that when executed by a computer causes the computer to perform:
- receiving notification that a land base drawing file is available, the land base drawing file being associated with a wirecenter and being a basis for redrawing a plat corresponding to the wirecenter and the land base drawing file into a new drawing format;
- creating a drawing conversion job record associated with the available land base drawing file, the drawing conversion job involving creation of a new drawing file based on at least information depicted in the land base drawing file and a prior plat of the wirecenter represented by the land base drawing file;
- storing the drawing conversion job record in a database;
- assigning the drawing conversion job record to a draftsman;
- recording the assignment of the drawing conversion job record in the database; and
- closing the job upon receipt of a close request from the draftsman to indicate that the plat has been redrawn in the new drawing format, by marking the drawing conversion job record as closed in the database.

20. The medium of claim 19, further comprising storing a plurality of drawing conversion job records in the database.

21. The medium of claim 20, further comprising providing a report comprising details for at least the plurality of drawing conversion job records in the database.

22. The medium of claim 20, further comprising providing a summary report of a plurality of available drawing conversion job records, assigned drawing conversion job records, and complete drawing conversion job records.

23. The medium of claim 20, further comprising providing a plurality of unassigned drawing conversion job records to a plurality of users.

24. The medium of claim 20, further comprising providing a plurality of completed drawing conversion job records to a plurality of users.

25. The medium of claim 19, wherein the land base drawing file and notification are provided by a regional land administration center.

26. The medium of claim 25, wherein the land base drawing file is in an engineering work order format.

27. The medium of claim 19, wherein the drawing conversion job record includes an availability date, wirecenter location information, a completed date, a quartile assignment, and a fiber units allocation.

\* \* \* \* \*